(12) United States Patent
Ito et al.

(10) Patent No.: US 7,595,921 B2
(45) Date of Patent: Sep. 29, 2009

(54) INCREASING PROFILE ACCURACY AND ACCELERATING PROFILE CREATION

(75) Inventors: Takashi Ito, Nagano-ken (JP); Makoto Fujino, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 643 days.

(21) Appl. No.: 11/142,656

(22) Filed: Jun. 2, 2005

(65) Prior Publication Data

US 2005/0270600 A1 Dec. 8, 2005

(30) Foreign Application Priority Data

Jun. 2, 2004 (JP) ............................. 2004-164781

(51) Int. Cl.
*G06K 1/00* (2006.01)
*G03F 3/08* (2006.01)
(52) U.S. Cl. .......................... 358/519; 358/1.9; 358/520
(58) Field of Classification Search .................. 358/1.9, 358/1.12, 518–520, 525; 382/167
See application file for complete search history.

(56) References Cited

U.S. PATENT DOCUMENTS

| 5,878,195 | A | * | 3/1999 | Mahy ........................... 358/1.9 |
| 6,124,944 | A | * | 9/2000 | Ohta ............................ 358/1.9 |
| 6,441,923 | B1 | * | 8/2002 | Balasubramanian et al. ......................... 358/3.23 |
| 6,657,746 | B1 | * | 12/2003 | Fuchigami et al. ........... 358/1.9 |
| 6,833,937 | B1 | * | 12/2004 | Cholewo ..................... 358/518 |
| 2002/0186383 | A1 | * | 12/2002 | Obrador ...................... 358/1.2 |
| 2003/0081831 | A1 | * | 5/2003 | Fukao et al. ................. 382/167 |
| 2003/0090726 | A1 | * | 5/2003 | Arai ............................ 358/2.1 |
| 2004/0234127 | A1 | * | 11/2004 | Arai et al. .................... 382/167 |

OTHER PUBLICATIONS

William Press et al "Numerical Recipes in C", p. 104-104, 113-115, Jun. 25, 1993.*
William H. Press et al., "Numerical Recipes in C", pp. 104-107, 113-115, Jun. 25, 1993.

* cited by examiner

*Primary Examiner*—Mark K Zimmerman
*Assistant Examiner*—Haris Sabah
(74) *Attorney, Agent, or Firm*—Sughrue Mion, PLLC

(57) ABSTRACT

When a profile to be referred to during conversion between different color systems is created, output color data that associates first and second color component data with their output colors is obtained, an interpolation function is generated based on the output color data for the first color component data, the interpolation function is corrected such that the interpolation results for the second color component data approximately matches the output color data for the second color component data, and a profile is created based on the corrected interpolation function.

14 Claims, 9 Drawing Sheets

INCREASING PROFILE ACCURACY AND ACCELERATING PROFILE CREATION

BACKGROUND OF THE INVENTION

1. Field of the Invention

The present invention relates to increase profile accuracy and accelerate profile creation.

2. Description of the Related Art

In an imaging device such as a display or printer, colors are specified via the specification of tone values for each of multiple color components within the color system used by the particular imaging device. These colors are generally dependent on the imaging device. Therefore, in order to enable the same image to be output from different imaging devices using the same colors, color matching is required, and a profile that specifies matching relationships between the tone values in the respective color systems is generally used. In this profile, in order to conserve resources, a matching relationship is not specified for every conceivable tone value combination; instead, relationships are specified using predetermined resources.

For example, a construction is used in which matching relationships are defined for the tone value sets for multiple predetermined reference points and a matching relationship for the tone value set for a given point is obtained via interpolation or calculated based on predetermined functions. In either case, data sets for points located between available data sets for a limited number of points are estimated based on an interpolation function (See, for example, William H. Press, Saul A. Teukolsky, William T. Vetterling and Brian P. Flannery, *Numerical Recipes in C* (Japanese edition), Gijutsu Hyoronsha, Feb. 6, 2004, $11^{th}$ printing, pp. 104-107, 113-114.) and matching relationships for the tone values for a given point are obtained. With such a construction, colors specified in one imaging device are reproduced by another imaging device.

SUMMARY OF THE INVENTION

The conventional color conversion program described above entails the following problems. The accuracy of color conversion depends on both the tone value sets defined in the profile and the accuracy of the function-based interpolation. The spline interpolation described in Non-Patent Document 1 above is deemed a method that can perform interpolation processing with high accuracy, and efforts have mainly been made in the selection of the tone value sets when creating a profile. Furthermore, the color system used by an imaging device is generally multidimensional, but spline interpolation in a multidimensional color space is extremely complex, and the required calculations are extremely time-consuming when a large number of reference points are used.

The present invention was devised in view of these problems, and an object thereof is to provide a method for performing interpolation calculation more accurately and more rapidly than the conventional spline interpolation calculation method.

In order to achieve the above object, in the present invention, two types of data are made available in advance, an interpolation function is created based on the first data and the created interpolation function is corrected based on the second data. Therefore, interpolation can be carried out more accurately in comparison with the situation in which interpolation is carried out based solely on the first data. In other words, the output color data for the first color component data is used for the creation of the interpolation function, and the output data for the second color component data is not used for such creation but for the correction of the created interpolation function.

Therefore, even where the output color data for the second color component data cannot be used or is difficult to use for the accurate calculation of the interpolation function, if it can be used for the correction of the interpolation function, the output data for the second color component data can essentially contribute to increasing the accuracy of the interpolation function. As a result, an interpolation function that enables more accurate interpolation to be performed can be obtained. More specifically, limitations may arise in connection with the color component value sets and output value sets to be used as reference values during determination of this function when interpolation processing such as spline interpolation processing takes place.

For example, where grid point positions in a multidimensional space correspond to independent variables, and dependent variable values are associated with such grid points, multidimensional interpolation may be carried out by repeating one-dimensional interpolation. In this case, grid points residing on common straight lines contribute to the determination of the interpolation function, but grid points not residing on these lines do not. However, in the present invention, because the output data for the second color component data is used for correction of the interpolation function, the second color component data can be used to make interpolation processing more accurate regardless of the relationship between the first color component data and the second color component data.

Here, color component data is data comprising multiple color component values and uniquely specifies a color output by a specific imaging device. In other words, a color component value is a value that specifies specific elements such as the density and brightness of the color component, the amount of recording material to be used, and the like, and a tone value in a prescribed tone value range by which the range of expression for this color component is defined. Therefore, an output color output by an imaging device can be specified by combined color values or a set of values obtained by specifying the color component values for each color component. Specifically, this applies to the CMY color system or RGB color system used to specify the recording material (ink, toner, etc.) used in the printing apparatus. Naturally, the color components of the CMY color system are not limited to CMY (cyan, magenta, yellow), and may include other colors such as black (K), light cyan (lc) and light magenta (lm). Furthermore, the present invention may be applied not only to the color spaces used in printing apparatuses but also to various types of imaging devices such as a scanner or display.

However, the output colors corresponding to color component value sets are generally device-dependent, and just because color component value sets are specified does not mean that common colors are objectively specified for all types of imaging devices. Accordingly, an output color for each set of color component data must be objectively specified via color measurement or the like, and in the output color data, values that objectively express output color are associated with each set of color component data. Here, as the values that objectively express color, values within a device-independent color space, such as a color space using the L*a*b* system, the L*u*v* system or the XYZ system, may be used.

In order to accurately associate color component data with output color, a construction is preferred in which data indicating the output color is obtained by actually outputting colors from the imaging device using the color component data and performing color measurement. Where color measurement is performed in this fashion, extremely accurate interpolation processing can be carried out via correction according to the present invention. Therefore, while the number of colors subjected to actual measurement is limited to the number of colors for which color measurement can be performed as a practical matter, a highly accurate profile can be created. For example, where $17^3$ or $32^3$ grid points are defined as the profile data used in an imaging device such as a printing apparatus, the number of grid points for which color measurement should be performed to obtain output color data can be limited only to $10^3$ or $12^3$.

In the operation to correct the interpolation function, first, the interpolation function is calculated. This interpolation function is a function that calculates via interpolation the output color corresponding to a given set of color component data based on output color data. In other words, because in the output color data, color component data is associated with an output color for multiple colors, it suffices if color component value between the color component data can be associated for corresponding output color. Various forms may be used for this function so long as correction can be carried out based on the second color component data.

It is acceptable if interpolation function correction can be performed based on the second color component data. In other words, an interpolation function generated based on the first color component data may be set to ensure an accurate association between the first color component data and its corresponding output color data, but in general, it cannot be guaranteed with this function that the associations between data that resides between the first color component data sets, such as the second color component data, for example, and its corresponding output color data will be strictly accurate. Accordingly, if the function is corrected such that the results of interpolation will approximately match the output data for the second color component data, the interpolation function can be controlled more accurately.

During the profile creation step, it is acceptable if profile data expressing a profile is generated based on the corrected interpolation function. In other words, using the corrected interpolation function, a given set of color component data and its corresponding output color can be associated with high accuracy. Therefore, profile data in which the two are accurately associated can be created. It is acceptable if table data associating color component data sets and output color data for each of multiple colors is used as this profile data, or if data is used that associates the two using data that expresses an interpolation function.

If a profile can be created, tone value conversion between the color spaces, i.e., color conversion, can be performed with reference to this profile. Furthermore, if the associations between color component value sets in a color system other than the color system used for the output color data (such as the sRGB color space) and the output colors are known in advance, a profile can easily be created that is used for color conversion between the data in this other color system and the above color component data (such as CMY color space data) using the associations.

In the present invention, output color data made available in advance includes two types of data, i.e., first and second color component data. Each of these two types of data includes data for multiple colors, but at the very least, the two types of data each comprise data selected using different rules. More specifically, the output color data may comprise data in which grid points in the first color space are associated with grid points in the second color space. Here, the first and second color component data can be differentiated from each other as first and second grid points, respectively. Because these are grid points selected according to different rules, they are arranged according to different rules within the first color space.

This construction offers a significant advantage when compared with the conventional profile data creation method. In other words, in the prior art, when profile data is created, grid points arranged according to two different rules are used, and this prior art profile can be used as is for the above construction. Specifically, in the prior art, the grid points in the first color space that are selected according to two different rules each respectively undergo output color measurement and are associated with grid points in the second color space, and profile data is created by adding grid points using spline interpolation based on the grid points arranged according to the first rule. When this is carried out, the grid points arranged according to the second rule are used to verify the conversion accuracy of the created profile data.

In other words, in the prior art, spline interpolation calculation is performed with reference to profile data on the assumption that spline interpretation is sufficiently accurate. When this is done, if the objects of this spline interpolation are the second grid points, the values obtained from interpolation can be compared with the true values (the colorimetric values for the second grid points). As a result, it can be verified whether or not the conversion accuracy of this profile data is sufficiently high to enable it to be used. If the conversion accuracy is not sufficiently high, the grid point arrangement or the separation processing method described below is changed and the profile data recreated. In this way, the second grid points and their colorimetric values do not necessarily contribute in and of themselves to improving the accuracy of profile data creation in the prior art, but they are essential to the verification of the conventional profile data. Accordingly, in the present invention, by correcting the interpolation function based on the second grid points, both the second grid points and their colorimetric values are permitted to contribute to increasing accuracy during profile data creation.

The color spaces described above are each defined as a color space having the same number of dimensions as the number of color components, each dimension in the color space is associated with one color component, and each point specified in the color space by specifying the color component values for each color component comprises a grid point in the color space. Furthermore, the first and second color spaces described above are different color spaces. The first color space is a color space used when a color is specified by the imaging device. The second color space is preferably a device-independent color space that can objectively specify a color actually output by the imaging device. If the grid points for such color spaces are associated with each other, a color output using a grid point (color component value set) in the device-dependent color space can be objectively specified, enabling a profile to be generated.

Grid points arranged along multiple parallel straight lines formed in the first color space may be used as the first grid points. In other words, if multiple grid points arranged along a straight line are used, the grid point in the second color space that corresponds to a grid point existing at a given position along this straight line can be calculated via spline interpolation. Furthermore, if straight lines connecting the grid points existing along different straight lines are taken into account, multidimensional spline interpolation can be carried out via spline interpolation using grid points along these straight lines.

The above grid point arrangement is often used during conventional profile creation, and if first grid points are arranged as described above, colorimetric data referred to during spline interpolation during the creation of profile data in the prior art can be used as the first grid points of the present invention. Incidentally, the multiple parallel straight lines are not limited to a single set of lines. For example, if multiple parallel lines are deemed to comprise one set, it is acceptable if straight lines belonging to different sets are not parallel to each other. In other words, the grid points may be arranged to enable spline interpolation over two or more dimensions.

As a specific example of second grid points, grid points arranged such that they are located at approximately equal distances from multiple adjacent first grid points may be used. In other words, in the conventional profile data creation in which spline interpolation is carried out based on the first grid points, in order to effectively verify the accuracy of the interpolation, the grid points positioned as far away as possible from adjacent first grid points are often used as the grid points employed for verification purposes. The second grid points located at approximately equal distances from multiple adjacent first grid points can be deemed the grid points that have the largest distances from the multiple adjacent first grid points. Therefore, if the second grid points comprise grid points of this type, the colorimetric data referred to in order to verify the accuracy of spline interpolation during conventional profile data creation can be used as the output color data in the present invention.

Moreover, it is preferred that either or both of the first and second grid points be arranged so as to form an orthogonal grid within the first color space. In other words, an orthogonal grid is created by obtaining multiple values by equally dividing the value ranges for the color components corresponding to each axis within a color space formed by orthogonal axes and combining the obtained respective values for each color component. As described above, it is extremely easy to set the grid points forming an orthogonal grid, and it is also easy to carry out spline interpolation using these grid points.

In an orthogonal grid, grid points covering the entire tone value range (i.e., the entire color gamut) in a nearly uniform fashion can be easily formed. If these grid points are selected, significant fluctuations in the color conversion accuracy obtained by the profile data can be avoided. Naturally, a construction may be adopted in which uniform grid points are not used. For example, a construction may be adopted in which, where color conversion accuracy within the color gamut is sought to be improved locally, a large number of grid points are placed within that area to obtain the output color data.

Furthermore, a construction may be adopted in which, where the first and second grid points both form orthogonal grids, the straight lines connecting the first grid points do not intersect with the straight lines connecting the second grid points. In such a construction, spline interpolation can be carried out using the first grid points positioned along multiple straight lines. In addition, because the second grid points do not exist along the straight lines connecting the first grid points, when this spline interpolation is carried out, highly accurate calculation based on normal spline interpolation using both the first and second grid points cannot be performed.

However, the second grid points can be placed regularly inside the orthogonal grid formed by the first grid points. For example, the second grid points can be placed in the centers of squares or cubes formed by the first grid points. In this case, the first and second grid points constitute typical examples of the colorimetric data referred to when a conventional profile is created and the colorimetric data used for verification. Therefore, the grid points prepared during creation of conventional profile data can be easily applied to the present invention.

Various different functions may be used as the interpolation function generated during the interpolation function correction operation, so long as correction may be carried out using the output color data for the second color component data. For example, an interpolation function may be employed wherein the color component values in the first color space are deemed independent variables and the color component values in the second color space are deemed dependent variables. If a typical spline interpolation function is employed, as described in Non-Patent Document 1 above, the function comprises a function that includes independent variable values and dependent variable values for the first grid points around the object of interpolation, second-order derivative values for these dependent variables, and the independent variable value for the grid point comprising the object of interpolation.

Here, values other than dependent variable values for the grid point that is the object of interpolation are naturally values that are known when the interpolation function is generated. A construction in which a typical spline interpolation function is used to obtain derivative grid point data in this fashion offers the following advantages. First, while the spline interpolation function includes the product of terms including independent variables and dependent variable values (or their second-order derivative values), if the terms including the independent variables are corrected, the behavior of the interpolation results in the section surrounded by the default independent variable values can be easily adjusted, and the interpolation function can be corrected. Second, the accelerated spline interpolation of the embodiment described below can be calculated from a typical spline interpolation function, and the function for this accelerated spline interpolation can also be corrected in the same fashion.

In the interpolation function correction operation, various constructions may be adopted so long as the interpolation function can be corrected such that the interpolation results approximately match the output color data for the second color component data. For example, a construction may be employed in which a certain ideal state is assumed and the optimal correction is carried out by coming as close as possible to this ideal state. In order to assume an ideal state and determine whether this ideal state is being approached, it is preferred that an evaluation function be defined by which the degree of correction of the interpolation function is evaluated.

In other words, according to the uncorrected interpolation function, at a minimum the association between the color component data and the output color is defined for the grid points, and no excessive deviation in interpolation accuracy between grid points should be expected. Accordingly, if the evaluation function is defined such that the evaluation result is poor as the degree of correction of the interpolation function increases, correction can be carried out without excessive correction of the original interpolation function. However, in the present invention, because correction is carried out by modifying the interpolation function such that the interpolation results approximately match the output color data for the second color component data, a complete match with the original function can be prevented. Various evaluation functions may be used here, such as a quasi-Newton method or the common-slope method.

In other words, in the present invention, correction is carried out to create a function different from a once-generated interpolation function, but because the interpolation resulting from the corrected function approximately matches the output color data for the second color component data, the degree of interpolation accuracy in the vicinity of the second grid points becomes very high. Furthermore, because the interpolation function is generally defined with reference to intervals between adjacent first color component data sets (first grid points), the first grid points can be harmonized with the associations exhibited by the output color data. Therefore, if the first grid points can be harmonized with the associations exhibited by the output color data, the first and second grid points will satisfy the association relationship exhibited by the output color data, and the degree of interpolation accuracy achieved by the corrected interpolation function can be reliably increased.

It is acceptable if the degree of such correction can be indicated as the amount of change due to interpolation function correction. For example, a value may be used that enables evaluation of the degree to which terms in the interpolation function subject to correction have changed after correction. Furthermore, the above ideal state is only hypothetical, and it would be desirable for the truly ideal state to be definable, but the ideal state need not be defined with exact precision. In other words, various evaluation functions may be used so long as there is improvement in the results of interpolation via the interpolation function after it is corrected.

It is furthermore acceptable if correction is implemented such that the interpolation results approximately match the output color data for the second color component data. As a specific example of this, a construction may be adopted wherein terms related to independent variables in the interpolation function are changed to polynomial expressions of an order larger than the order used prior to correction. In other words, if the order of independent variables increases in the interpolation function, the behavior of the interpolation results can be described with more precision, and it is easy to make the interpolation results approximately match the output color data for the second color component data. The terms related to independent variables may comprise the independent variables themselves or terms that include independent variables and other values (such as independent variable values for grid points). In either case, if the order of the terms involving independent variables can be increased, the interpolation results (dependent variables) can be controlled more flexibly.

Using these polynomial expressions, while the interpolation results can be controlled more flexibly, the interpolation results may fluctuate due to an excessive amount of latitude, or multiple interpolation solutions may be obtained, resulting in failure of the corrected interpolation function. Accordingly, it is preferred that constraints be introduced to prevent such a failure. As a specific example, a constraint may be imposed whereby the above polynomial expressions change monotonously when the above independent variable-related terms include first-order independent variables.

In other words, where an independent variable-related term includes a first-order independent variable, this term changes monotonously (linearly) relative to the independent variable. If this term does not change monotonously and fluctuates relative to the independent variable, it leads to a failure such as fluctuation in the interpolation results or the existence of multiple interpolation solutions. Accordingly, if a constraint is imposed such that change occurs monotonously even after the introduction of correction to describe these terms via polynomial expressions, failure in the interpolation results can be prevented. The state in which the above polynomial expression changes monotonously here is not limited to the case where the polynomial expression changes monotonously relative to the independent variable, and includes the case where an independent variable-related term is deemed a prescribed variable and the polynomial expression changes monotonously relative to this variable. In other words, because an independent variable-related term includes a first-order independent variable, the behavior of the polynomial expression relative to the independent variable resembles its behavior relative to the independent variable-related term, and either may be deemed the constraint.

Furthermore, during correction, the above polynomial expressions can be expressed as a sum of terms derived by multiplying the power of the independent variable-related terms by prescribed coefficients. In this case, the polynomial expressions can be specified by determining the coefficients. Where multidimensional interpolation is performed by repeating one-dimensional interpolation, to make processing easier, it is preferred that the polynomial expressions be defined for each dimension. However, where the polynomial expressions are defined for each dimension, while the continuity of the interpolation results can be assured in the defined direction, continuity of the interpolation results cannot be assured for other directions.

Accordingly, if the coefficients are made dependent on independent variable-related terms, the continuity of the interpolation results can be assured. In other words, if the coefficients depend on independent variables or independent variable-related terms, the coefficients can be described such that they change in accordance with the independent variables or the independent variable-related terms with regard to the other directions. If the coefficients change with regard to the other directions, the interpolation results can also be changed, and therefore the coefficients can be determined such that the continuity of the interpolation results is assured.

During interpolation function correction, the interpolation results resulting from application of the interpolation function need not always exactly match the output color data for the second color component data. In other words, while a match is preferred, if priority is placed on creating a match, it is possible that the constraint described above may not be fulfilled. In this case, it is acceptable if priority is not placed on having the interpolation results match the output color data for the second color component data, but rather on fulfillment of the constraint. In this sense, when correction is carried out, it may be said that it is sufficient if the interpolation results resulting from application of the interpolation function approximately match the output color data for the second color component data.

Various constructions may be adopted to obtain the pre-correction interpolation function in connection with the above interpolation function correction operation. For example, an interpolation formula equivalent in result to repeating the interpolation operation using a one-dimensional interpolation function the same number of times as the number of dimensions in the first color space may be used. In other words, if this interpolation formula is calculated in advance and data indicating this algorithm is recorded on a prescribed recording medium, an interpolation function can be easily obtained simply by referring to this data. Here, the one-dimensional interpolation formula used to obtain this interpolation formula is preferably a formula that calculates dependent variable values for a grid point to be interpolated based on the independent variable values, dependent variable values and high-order derivative values for the grid points arranged in straight lines and the independent variable value for the grid point to be interpolated. Spline interpolation is a specific example of this type of interpolation. The high-order derivative values described above include derivative values obtained via second-order differentiation for each of the different dimensions.

Incidentally, the above profile creation method of the present invention can be implemented in various ways, such as on its own or together with a different method while incorporated in a given apparatus, and may be modified in any appropriate fashion. Furthermore, as described above, regarding the method in which the interpolation function is corrected based on verification data obtained in advance, the processing advances according to a prescribed sequence, and naturally the present invention is the basis for this procedure. Therefore, the present invention can also be applied as a method. When the present invention is implemented, a prescribed program may be executed on a profile creation device. Therefore, the present invention may be applied as this program as well.

Because highly accurate color conversion can be performed if color conversion is carried out during printing based on profile data created as described above, when this profile data is applied in the present invention, printing can be executed with highly accurate color matching. Furthermore, because conversion from the color system used for the input image data to the color system used by the printing apparatus is required when printing control is executed, in order to carry out this color conversion during printing control, a profile used to perform this color conversion between the two color systems should be created in advance based on the profile data of the present invention.

Naturally, color conversion may be carried out using a different profile and the profile pertaining to the present invention. For example, where the second color space in the profile of the present invention is a device-independent color space, if a profile that establishes the associations between the color system used by the image data and the device-independent color system is prepared as the different profile described above, color conversion can be easily carried out using this different profile and the profile pertaining to the present invention. Naturally, where the first color space in the profile pertaining to the present invention differs from the color system used by the printing apparatus, a profile that associates the two may be created in advance.

Furthermore, any type of recording medium may be used to provide the program. For example, the medium may comprise a magnetic or opto-magnetic recording medium, or any type of recording medium that may be developed in the future. Furthermore, where the present invention is implemented partly via software and partly via hardware, the concepts of the present invention remain the same, and a format wherein part of the program is recorded on a recording medium and is loaded when needed is included as well. Moreover, the same principle naturally applies to copies including first copies and second copies.

DETAILED DESCRIPTION OF THE PREFERRED EMBODIMENTS

Embodiments of the present invention will be described below in the following order.

Figure 1:
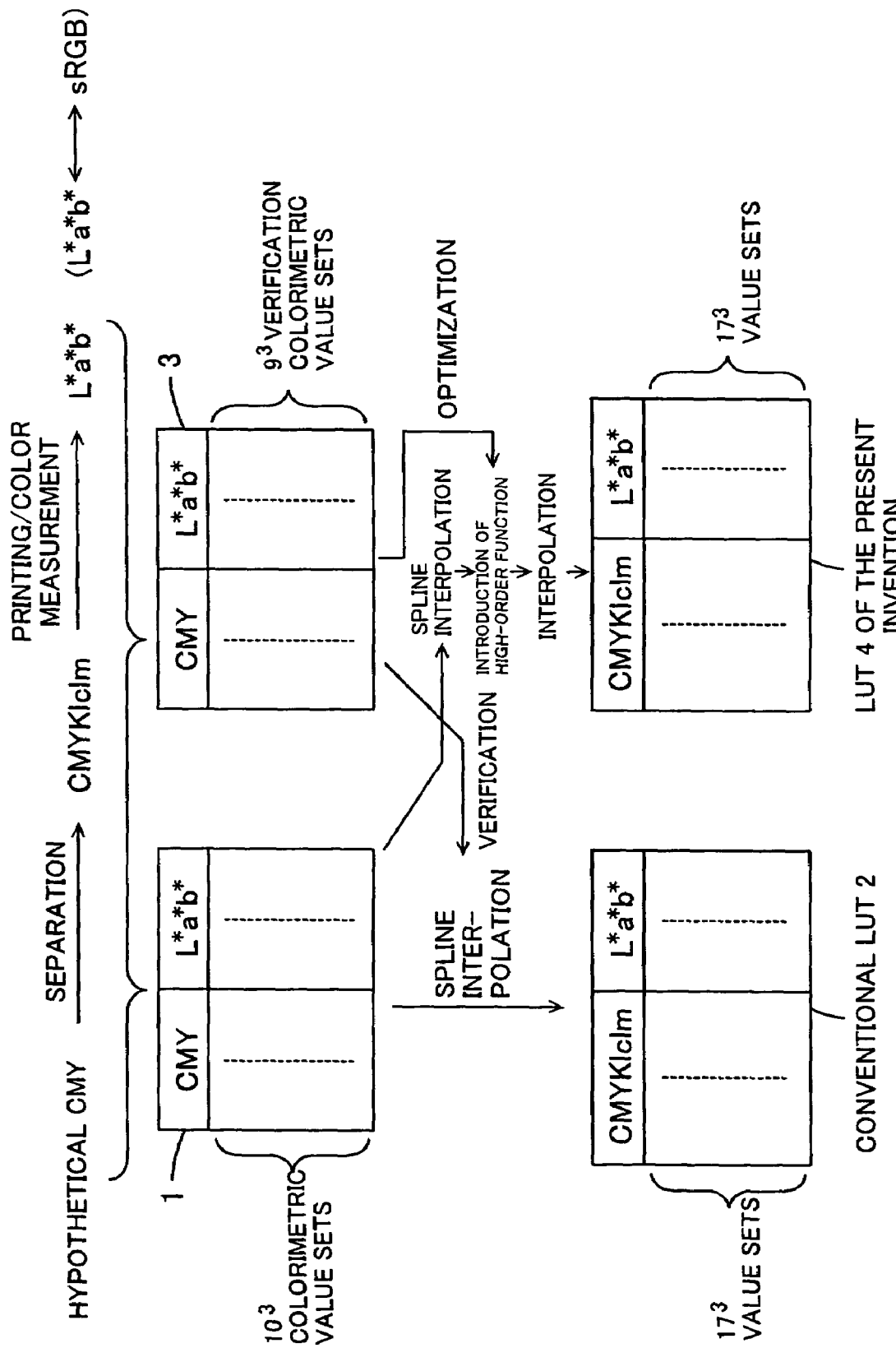
FIG. 1 is a drawing showing the basic outline of the creation of a LUT.

(1) Summary of the present invention
(2) Construction of color conversion table creating device
  (2-1) Correction and optimization of spline interpolation formula;
  (2-2) Expansion to two-dimensional space
  (2-3) Expansion to three-dimensional space
  (2-4) Color conversion processing based on created color conversion table data
(3) Other embodiments (1) Summary of the Present Invention FIG. 1 is a drawing showing the basic outline of the creation of a lookup table (LUT) pertaining to the present invention. In connection with the creation of this LUT, the present invention achieves notable results, i.e., high accuracy and high speed, that cannot be obtained using spline interpolation executed according to the prior art. While various methods may be employed to create the LUT, the present discussion pertains to a LUT that establishes the associations between data that directly specifies the amount of recording material (ink or toner) used by the printer and data in a device-independent color space.

Furthermore, with regard to this drawing, a situation in which the various inks of CMYKlclm (cyan, magenta, yellow, black, light cyan, light magenta) are stored in the printer and the L*a*b* color space is used as the device-independent color space will be described. The amounts of the CMYKlclm inks are normally specified in terms of a tone value (a tone value from among 256 tones, for example), and a large number of colors is expressed by changing the tone value for each of the CMYKlclm colors independently within the range of 0-255.

Using the CMYKlclm data that specifies tone values for these CMYKlclm colors, a specific color can be indicated by specifying ink amounts, but because the ink amounts output for each tone value differ based on such factors as the printer model and the printing mode, the colors specified via this CMYKlclm data are so-called device-dependent colors. Therefore, the color that will actually be obtained as an output color cannot be objectively determined simply from the CMYKlclm data. Accordingly, in order to ensure printing that faithfully reproduces colors of images contained in printing instructions issued from a computer, CMYKlclm data used to print colors in accordance with the specified colors must be calculated with reference to a LUT.

In order to carry out such calculation, associations between L*a*b* data that can objectively specify a color and CMYKlclm data are established in the LUT. However, associating L*a*b* data and CMYKlclm data for any given number of combinations of CMYKlclm data sets would result in an enormous number of associations, which would be a wasteful use of computer resources. Accordingly, a LUT is created that establishes associations between a fixed number ($17^3$ or $32^3$, for example) of CMYKlclm data sets and L*a*b* data sets, and the L*a*b* data set corresponding to a given CMYKlclm data set is sought via calculation, for example.

In general because colors specified via CMYKlclm data are device-dependent colors, as described above, multiple patches for which colors are specified via CMYKlclm data are printed out, and accurate L*a*b* values are obtained and a LUT is created by performing color measurement of the printing results. When this is done, because it would be extremely burdensome to print $17^3$ patches as described above and carry out error-free color measurement of them all, normally, color measurement of a more realistic number of patches for carrying out printing and color measurement, such as $10^3$, is performed.

Even if the number of colors subjected to color measurement is less than the number of CMYKlclm data sets in the final LUT, if interpolation is carried out based on the colorimetric data, CMYKlclm data/L*a*b* data associations can be established for a larger number of points. Here, the CMYKlclm data sets established in the LUT must be determined based on various limitations, such as that (i) the data sets cover the printer's entire color range, (ii) the upper limit on the total amount of ink that can be recorded on the printing medium is not exceeded, and (iii) the granular feel caused by ink droplets is minimized.

With six-dimensional CMYKlclm data, it is difficult to satisfy these limitations while freely combining tone values for each of the color components. In addition, calculating L*a*b* values via interpolation from six-dimensional CMYKlclm data is a complex task. Accordingly, after tone values in a color space that has fewer dimensions and can express a color gamut in a more simple form are determined, six-dimensional CMYKlclm data is generated using the so-called separation processing method.

First, as shown at the upper left side of FIG. 1, tone values are determined for each color component in a hypothetically-formed CMY space ('hypothetical CMY'). Here, hypothetical CMY tone values are hypothetical tone values corresponding to the depth of each of the CMY colors. These CMY tone values can be considered to correspond to CMY ink amounts among the various CMYKlclm inks stored in the printer, but it is not necessary to define which combinations of the various tone values will result in what output colors. This color space is therefore termed a hypothetical CMY space in the sense that it is a color space that need not indicate actual output colors.

If a color space comprises three dimensions like the hypothetical CMY space, it is easy to cover the entire color gamut for the hypothetical CMY space by selecting colors that will cover the tone value range for each color component, and if the tone value range for each color component is divided into nine equal parts and the values are combined, for example, CMY data incorporating $10^3$ data sets can be easily generated. Separation processing is a process in which colors expressed in three dimensions are converted into six-dimensional colors using specified rules. For example, if it is assumed that ink of each of the CMY colors is recorded on a printing medium, a color that is almost achromatic, i.e. black, can be expressed by recording each of the CMY inks in roughly equal amounts. Accordingly, if some of the hypothetical CMY tone values are replaced with K according to specified rules, a set of CMYK tone values that generate the basically identical color as the CMY tone value set can be generated from the CMY tone value set.

Furthermore, because lc is light cyan and lm is light magenta, by partially replacing the C tone value comprising dark cyan with lc according to specified rules and partially replacing the M tone value comprising dark magenta with lm according to specified rules, a CMYKlclm tone value set that can generate the basically identical color as a CMYK tone value set can be generated from the CMYK tone value set. When this replacement is performed, it can be ensured that, as described above, the total ink amount does not exceed the upper limit that can be recorded on the printing medium and a granular feel caused by the ink droplets does not occur. According to this separation processing, CMYKlclm data can be associated with the hypothetical CMY data in a one-to-one fashion.

Therefore, by dividing the tone value range into equal parts, specifying hypothetical CMY tone value sets, performing printing based on the CMYKlclm data resulting from separation processing of the CMY tone values and then carrying out color measurement, the hypothetical CMY tone value sets can be associated with L*a*b* value sets. If the rules governing the above separation processing are set properly, the combinations of values obtained by dividing the tone value ranges in the hypothetical CMY color space into equal parts as described in the above example can be subjected to color measurement. Therefore, a Table 1 that associates $10^3$ hypothetical CMY tone value sets with colorimetric value (L*a*b*) sets as shown in the LUT 1 shown in FIG. 1 can be created from grid points arranged uniformly within the color range of the hypothetical CMY space. Here, if the hypothetical CMY space is considered to be a three-dimensional orthogonal space, these combinations of values comprise orthogonal grid points arranged uniformly across the space.

In the prior art, a LUT was created by obtaining associations between a desired number of hypothetical CMY tone value sets (such as $17^3$ or $32^3$) and L*a*b* value sets via spline interpolation using this Table 1 and converting these hypothetical CMY tone values into CMYKlclm data according to separation rules. In other words, CMYKlclm data and L*a*b* data were associated and a conventional LUT 2 was created. Naturally, so long as separation rules are established, even thought a LUT that defines associations between hypothetical CMY values and L*a*b* values is used, the resulting LUT2 is equivalent to the LUT2 of the prior art.

Here, the usefulness of the LUT2 depends on the accuracy of the spline interpolation, and can be determined based on whether or not the L*a*b* values corresponding to the CMYKlclm data can by calculated accurately. As a result, in general, the L*a*b* values obtained via spline interpolation and the actual colorimetric values are compared regarding the points for which the accuracy of the spline interpolation is thought to be the lowest to determine whether the degree of accuracy is sufficient to provide practical utility. For example, color component tone values for two adjacent value sets are extracted from the $10^3$ hypothetical CMY tone value sets described above and a hypothetical CMY tone value set used for verification is generated by combining the mid-point value between the two tone values for each CMY color. In other words, a hypothetical CMY tone value set located midway between the orthogonal grid points is obtained.

If separation processing is carried out to these hypothetical CMY tone value sets, printing is performed using the obtained CMYKlclm data and the obtained printing results are subjected to color measurement, L*a*b* value sets corresponding to the hypothetical CMY tone value sets are obtained. In other words, the Table 3 shown in FIG. 1 is created. In this example, the number of calorimetric value sets registered in the Table 3 is $9^3$.

Once this Table 3 is obtained, the L*a*b* value sets corresponding to hypothetical CMY value sets identical to the hypothetical CMY value sets established in this Table 3 are calculated via spline interpolation based on the Table 1. As a result, the actual colorimetric values established in the Table 3 can be compared with the values obtained via interpolation based on the Table 1, and as a result of this comparison, it can be determined whether or not the conventional LUT 2 is sufficiently accurate to offer practical utility.

In this conventional LUT 2, where the accuracy is insufficient to provide practical utility, it is possible to change the rules for separation processing, for example, but because interpolation accuracy is not directly controlled via such change, it is extremely difficult as a practical matter to improve interpolation accuracy. Furthermore, while $(10^3+9^3)$ colorimetric value sets are obtained, only $10^3$ are colorimetric value sets that can be used for spline interpolation as a practical matter, and the remaining $9^3$ colorimetric value sets does not directly contribute to improving interpolation accuracy. Furthermore, even where the $9^3$ colorimetric value sets are used to improve accuracy, because multidimensional interpolation value sets are obtained during normal spline interpolation by carrying out interpolation for one dimension at a time, it is extremely difficult to use the $9^3$ colorimetric value sets that do not reside on the straight lines connecting the $10^3$ orthogonal grid points.

Figure 2:
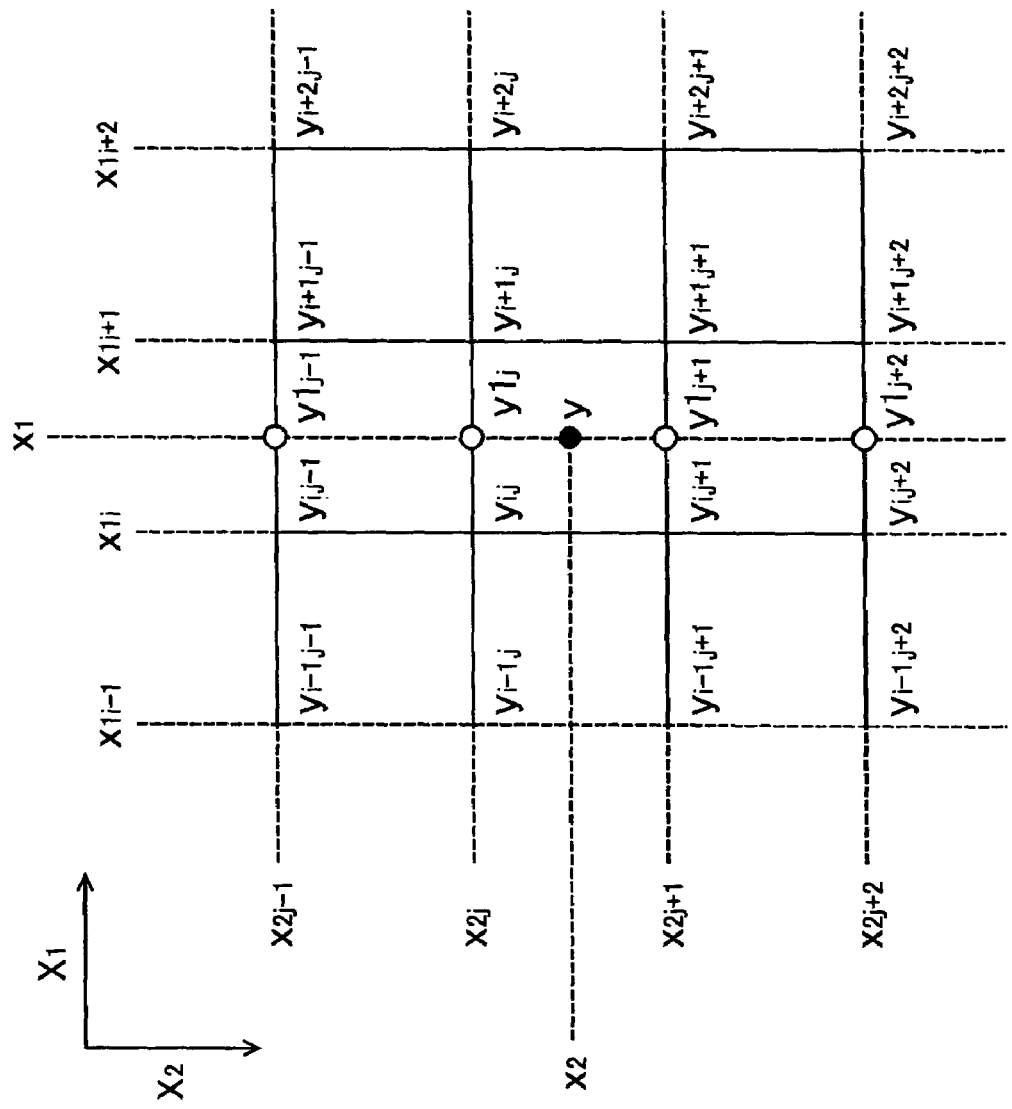
FIG. 2 is a drawing by which to explain spline interpolation in a multidimensional space.

FIG. 2 is a drawing by which to explain spline interpolation in a multidimensional space. In the drawing, a situation is shown in which for simplicity's sake interpolation value sets in a two-dimensional space are calculated via spline interpolation, where (x) indicates an independent variable and is equivalent to a position in the two-dimensional space and (y) is a dependent variable associated with each position. In this example, the independent variable value sets form an orthogonal grid, the hypothetical CMY values in the above Table 1 can be considered equivalent to these independent variable values, and the L*a*b* values can be considered equivalent to these dependent variable values. When multidimensional dependent variable values (for example, L*a*b* values) are calculated, an interpolation function that provides the dependent variable value should be used for each dimension (i.e., an interpolation function for each of L*, a* and b*) (and the same holds true for the discussion below).

In FIG. 2, $x_1$ indicates a variable whose value changes along the abscissa axis on the surface of the paper (the $X_1$ direction), while $X_2$ indicates a variable whose value changes along the longitudinal axis on the surface of the paper (the $X_2$ direction). Furthermore, the grid point positions in the $X_1$ direction are indicated by the letter (i), and the grid point positions in the $X_2$ direction are indicated by the letter (j). The dependent variables at each grid point are indicated by the letters (ij). In order to calculate the dependent variables (y) for a given position $(x_1, x_2)$ in a two-dimensional space via spline interpolation, first, spline interpolation for the $X_1$ direction is performed, and then spline interpolation for the $X_2$ direction is performed.

One-dimensional spline interpolation is defined by the equation (1) below.

$$y = Ay_j + By_{j+1} + Cy''_j + Dy''_{j+1} \quad (1)$$

Here, the dependent variables $y_j$, $y_{j+1}$ are values associated with the respective independent variables $x_j$, $x_{j+1}$, and $y''_j$, $y''_{j+1}$ are second-order derivatives in the X direction relating to the respective independent variables $x_j$, $x_{j+1}$.

A and B in the above equation (1) are defined by the equations (2) below, $$A = \frac{x_{j+1} - x}{x_{j+1} - x_j} \quad (2)$$

$$B = 1 - A = \frac{x - x_j}{x_{j+1} - x_j}$$

while C and D in the above equation (1) are defined in the equations (3) below.

$$C = \frac{1}{6}(A^3 - A)(x_{j+1} - x_j)^2 \quad (3)$$

$$D = \frac{1}{6}(B^3 - B)(x_{j+1} - x_j)^2$$

The second-order derivative $y''_j$ in the above equation (1) is sought by imposing the condition that the first-order derivatives of the equation (1) using (x) be continuous across the boundaries of the intervals. When first-order differentiation of the equation (1) is performed using (x), the result may be expressed via the equation (4) below.

$$\frac{dy}{dx} = \frac{y_{j+1} - y_j}{x_{j+1} - x_j} - \frac{3A^2 - 1}{6}(x_{j+1} - x_j)y''_j + \quad (4)$$

$$\frac{3B^2 - 1}{6}(x_{j+1} - x_j)y''_{j+1}$$

Here, if the value of the equation (4) evaluated in the interval $(x_{j-1}, x_j)$ is set to be equal to the value of the equation (4) evaluated in the interval $(x_j, x_{j+1})$ when $x=x_j$, the equation shown as the equation (5) below can be obtained.

$$\frac{x_j - x_{j-1}}{6}y''_{j-1} + \frac{x_{j+1} - x_{j-1}}{3}y''_j + \quad (5)$$

$$\frac{x_{j+1} - x_j}{6}y''_{j+1} = \frac{y_{j+1} - y_j}{x_{j+1} - x_j} - \frac{y_j - y_{j-1}}{x_j - x_{j-1}}$$

The boundary condition expressed by the equation (5) expresses (N−2) simultaneous equations over $x=(x_1, x_{N-2})$, and $y''_j$ may be sought by solving these simultaneous equations. Here, N indicates the number of grid points in the x direction. In this Specification, $x_1$ normally indicates a given position in the $X_1$ direction, but in the above interval $(x_1, x_{N-2})$, numbers from 0 to (N−1) are assigned in order from the end to grid points in the $X_1$ direction, and the positions of the grid points excluding those at either end are shown as $x_1$ through $x_{N-2}$.

In the above equation (5), N number of unknown second-order derivatives $y''_j$ exist, but because the above simultaneous equations comprise (N−2) number of simultaneous equations, two more conditions are required. Typically, it is sufficient if the values for $y''_0$ and $y''_{N-1}$ are specified. (For example, the conditions of $y''_0=0$ and $y''_{N-1}=0$, which are generally termed a natural cubic spline, may be adopted.) This is explained in detail in *Numerical Recipes in C* (Japanese edition), Gijutsu Hyoronsha, p. 105, for example.

If a second-order derivative can be calculated as described above, the spline function shown in the equation (1) can be defined and a dependent variable value corresponding to a given independent variable value over a defined interval can be calculated. Therefore, in order to calculate the spline interpolation formula of the equation (1), N independent variables $x_0$ through $x_{N-1}$ and corresponding dependent variables $y_0$ through $y_{N-1}$ are required.

In other words, in order to calculate the dependent variable value (y) for the position $(x_1, x_2)$ in FIG. 2 from a spline interpolation formula for the $X_2$ direction, the dependent variable values $y1_0, \ldots, y1_j, \ldots, y1_{N2-1}$ for the positions $(x_1, x_{20}), \ldots, (x_1, x_{2j}), \ldots, X_1, x_{2N2-1})$, which include the positions indicated by white circles in FIG. 2, are required. ($N_2$ represents the number of grid points in the $X_2$ direction. In the explanation pertaining to FIG. 2, $x_1$ is not an end grid point position, but rather indicates a given position in the $X_1$ direction.)

In addition, in order to obtain the dependent variable values for the positions indicated by the white circles, spline interpolation for the $X_1$ direction must be carried out. For example, in order to calculate the dependent variable $y1_{j-1}$, the dependent variable values $y_{0j-1}, \ldots, y_{ij-1}, \ldots, y_{N1-1j-1}$ for the positions $(x_{10}, x_{2j-1}), \ldots, (x_{1i}, X_{2j-1}), \ldots, (x_{1N1-1}, x_{2j-1})$ are required. ($N_1$ indicates the number of grid points in the $X_1$ direction.)

In short, in order to calculate the dependent variables (y) for a given position $(x_1, x_2)$ via spline interpolation, first, spline interpolation for the $X_1$ direction is carried out using the dependent and independent variables for $N_1 \times N_2$ grid points corresponding to the number of points of intersection of the solid lines shown in FIG. 2 to obtain the dependent variable value for the position $x_1$. Then, based on the obtained $N_2$ dependent variable values, spline interpolation is performed for the $X_2$ direction to obtain the dependent variable value (y) for the position $x_2$. Naturally, the directions for which spline interpolation is performed may be selected in the order of $X_2, X_1$.

As described above, in spline interpolation, dependent variable values for a given position in a multidimensional space can be obtained by repeating one-dimensional spline interpolation, but the accuracy of this interpolation method generally declines as one moves away from an actual colorimetric value set (i.e., a grid point in FIG. 2). Accordingly, by extracting two adjacent values for each color component from the hypothetical CMY tone values specified in Table 1 and combining the values for the midpoint of these two values for each of the CMY colors, positions having the distance from respective hypothetical CMY tone value sets established in Table 1 are obtained and deemed the colorimetric value sets used for verification.

In the prior art, verification is carried out by comparing these verification colorimetric values and the spline interpolation results for the multidimensional space, and if the accuracy is insufficient for practical utility, the separation rules are corrected, for example. However, because the original colorimetric values used during spline interpretation (in the example of FIG. 1, $10^3$ colorimetric value sets) and the verification colorimetric values are accurate values, unless the latter values can be calculated using the former values, interpolation accuracy cannot be considered highly accurate. While interpolation errors can occur, and it has been thought difficult to exceed the accuracy of spline interpolation, the applicants herein have overcome this difficulty via optimization, and realized more accurate interpolation.

In other words, as shown in the center of the right-hand side of FIG. 1, interpolation using the spline interpolation function is assumed, but the terms that depend on independent variables in this interpolation formula are expressed using higher-order functions than the terms in a general spline interpolation formula. By optimizing the function form for these higher-order functions, an interpolation formula that enables the most accurate possible interpolation of the verification colorimetric values can be derived from the above original colorimetric value.

Using this interpolation formula, interpolation can be performed with more accuracy than that available using the conventional spline interpolation formula. A LUT 4 is created by (i) obtaining, based on the original colorimetric value sets, L*a*b* value sets corresponding to a desired number (for example $17^3$ or $32^3$) of hypothetical CMY tone value sets, and (i) converting these hypothetical CMY tone value sets into CMYKlclm data according to separation rules. In the present invention, a construction is adopted wherein interpolation can be performed at high speed when the LUT 4 is created, but the details will be described below.

The construction of the LUTs shown in FIG. 1 are merely examples, and naturally, any LUT that establishes associations between a color system used on a computer (such as the sRGB color system, for example) and a color system used by a printer may be used. Because coordinate values in the sRGB color system can be associated with L*a*b* values via calculation, by referring to these associations as well as the associations in the LUT 4 shown in FIG. 1, a LUT that associates the sRGB color system with the CMYKlclm color system can be easily created.

(2) Construction of Color Conversion Table Creating Device

Figure 3:
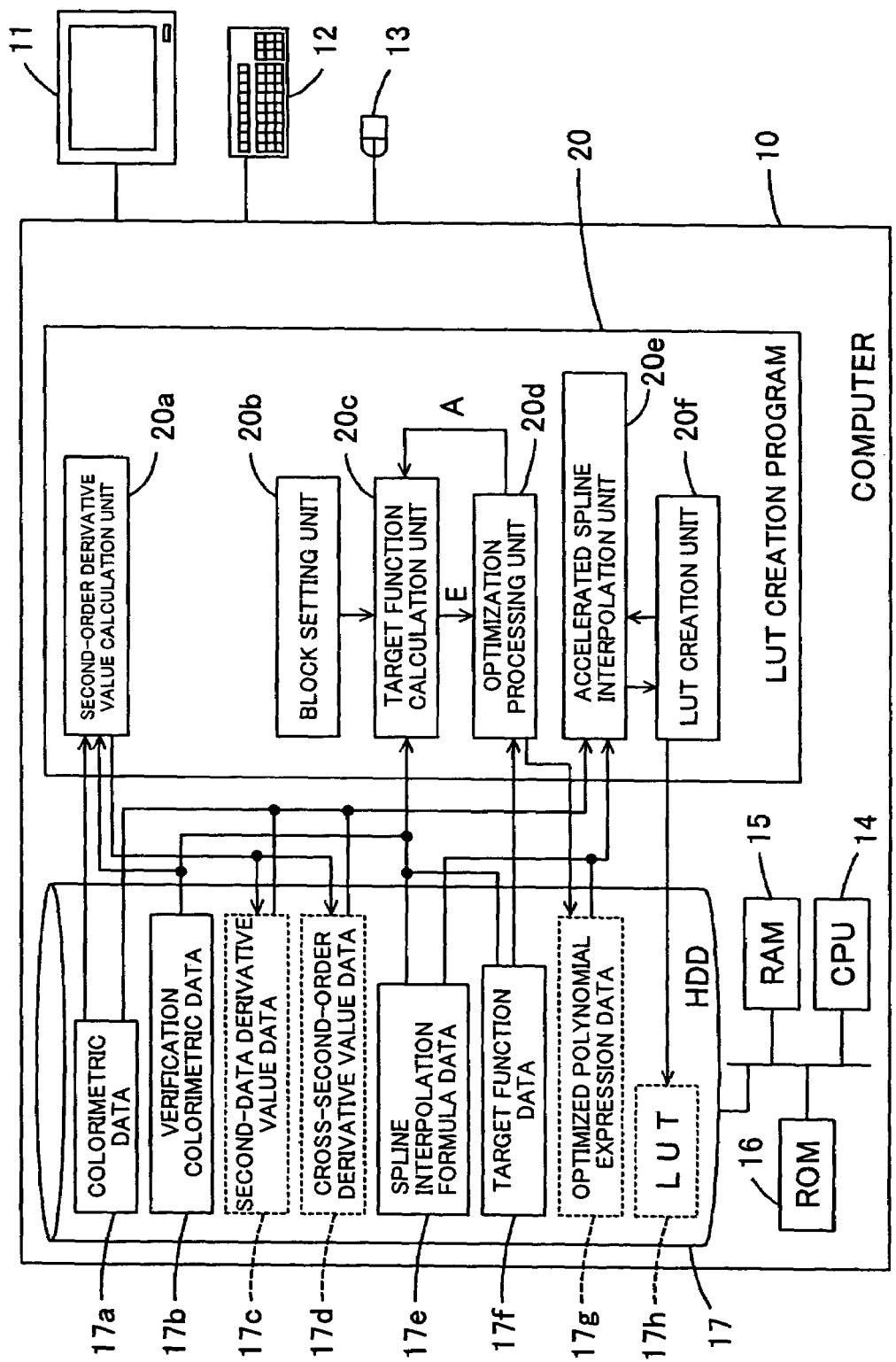
FIG. 3 is a block diagram showing an example of the construction of a color conversion table creating device.
Figure 4:
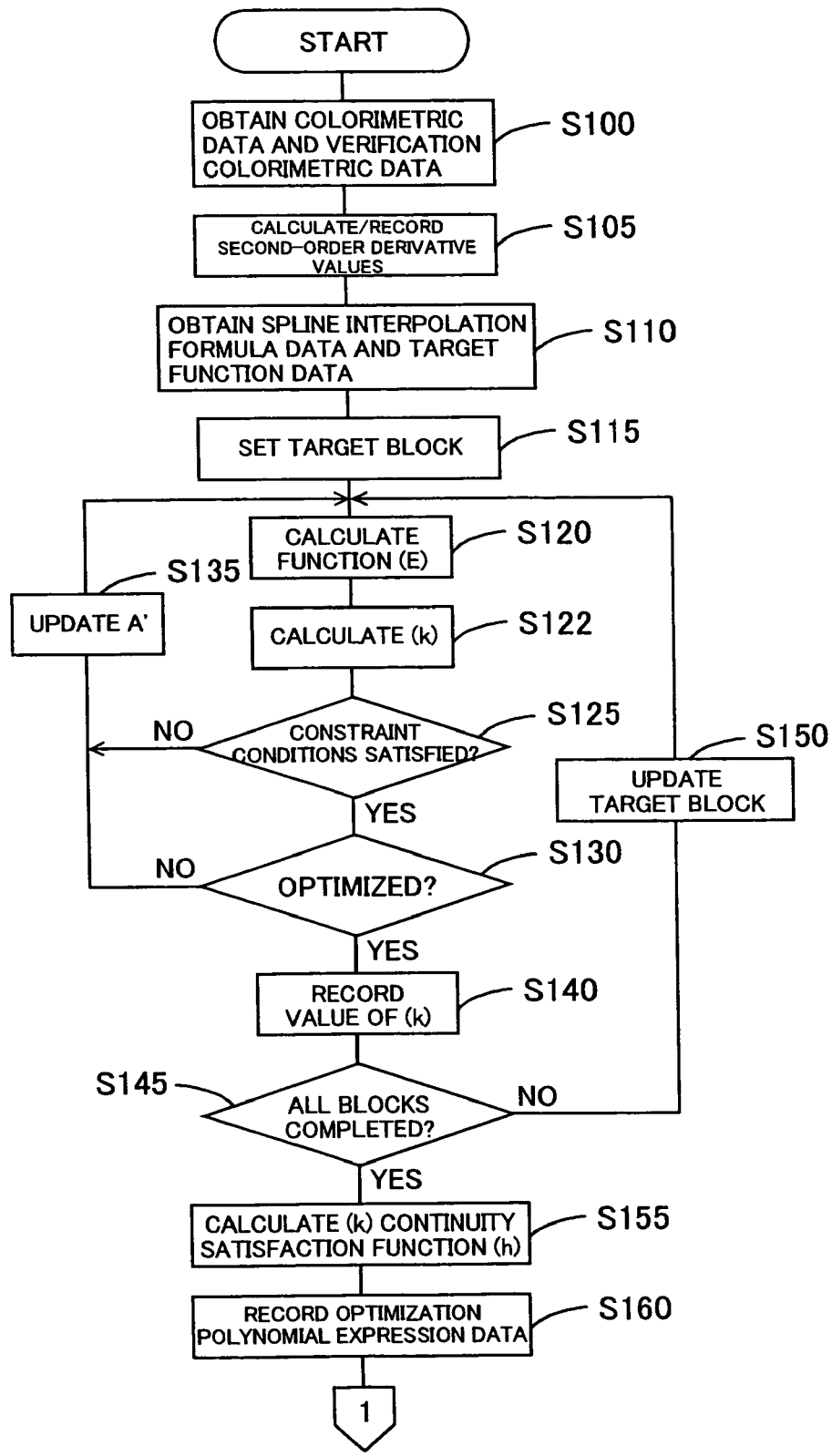
FIG. 4 is a flow chart of the processing carried out by the color conversion table creating device.
Figure 5:
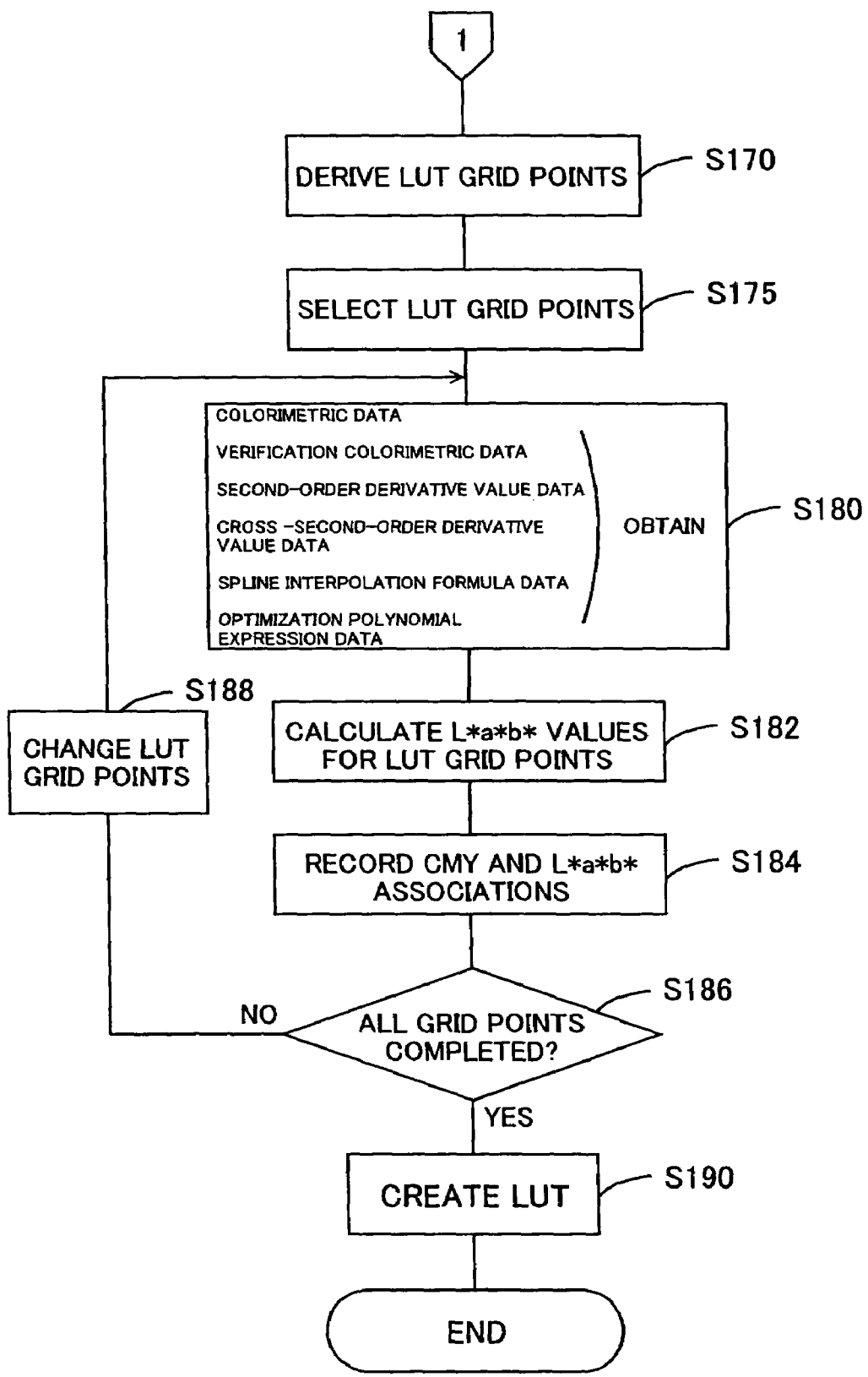
FIG. 5 is a flow chart of the processing carried out by the color conversion table creating device.

Next, the device to create the LUT of the present invention and its associated processing will be described in detail below. FIG. 3 is a block diagram showing the color conversion table creating device of the present invention, and FIGS. 4 and 5 are flow charts of the processing executed by this color conversion table creating device. This embodiment is realized via a computer 10 that can execute the LUT creation program that creates the LUTs described herein.

FIG. 3 shows the basic construction of this computer 10. With reference to the drawing, the computer 10 may comprise a generally-used personal computer, and includes user interfaces such as a display 11, a keyboard 12 and a mouse 13, and is equipped to execute prescribed programs. In other words, it includes a CPU 14, a RAM 15, a ROM 16, an HDD 17 and the like, and can execute a LUT creation program 20 under the control of an operating system not shown in the drawing.

The LUT creation program 20 includes a second-order derivative value calculation unit 20a, a block setting unit 20b, a target function calculation unit 20c, an optimization processing unit 20d, an accelerated spline interpolation unit 20e and a LUT creation unit 20f. The LUT creation program 20 creates a LUT using data recorded on the HDD 17 or generated data where appropriate. In the HDD 17 shown in FIG. 3, the data recorded in advance on the HDD 17 is indicated by a rectangle formed by a solid line, and the data generated via processing is indicated by a rectangle formed by a broken line.

During LUT creation, colorimetric data is made available in advance. In other words, patches are printed based on the hypothetical CMY tone value sets described above in advance on the printer that is to perform printing with reference to the created LUT, and the printed patches are subjected to color measurement. The results are stored on the HDD 17 as data indicating the hypothetical CMY tone values and the colorimetric values associated therewith. In the example shown in FIG. 3, colorimetric data 17a is equivalent to the $10^3$ colorimetric value sets shown in FIG. 1 and is created by equally dividing the tone value range for each of the CMY colors, combining the thus obtained values to generate CMY tone value sets, performing color measurement of the printing results for these tone value sets and associating the printing results with the CMY tone value sets. The tone value sets in this colorimetric data 17*a* comprise an orthogonal grid in the hypothetical CMY space.

Figure 8:
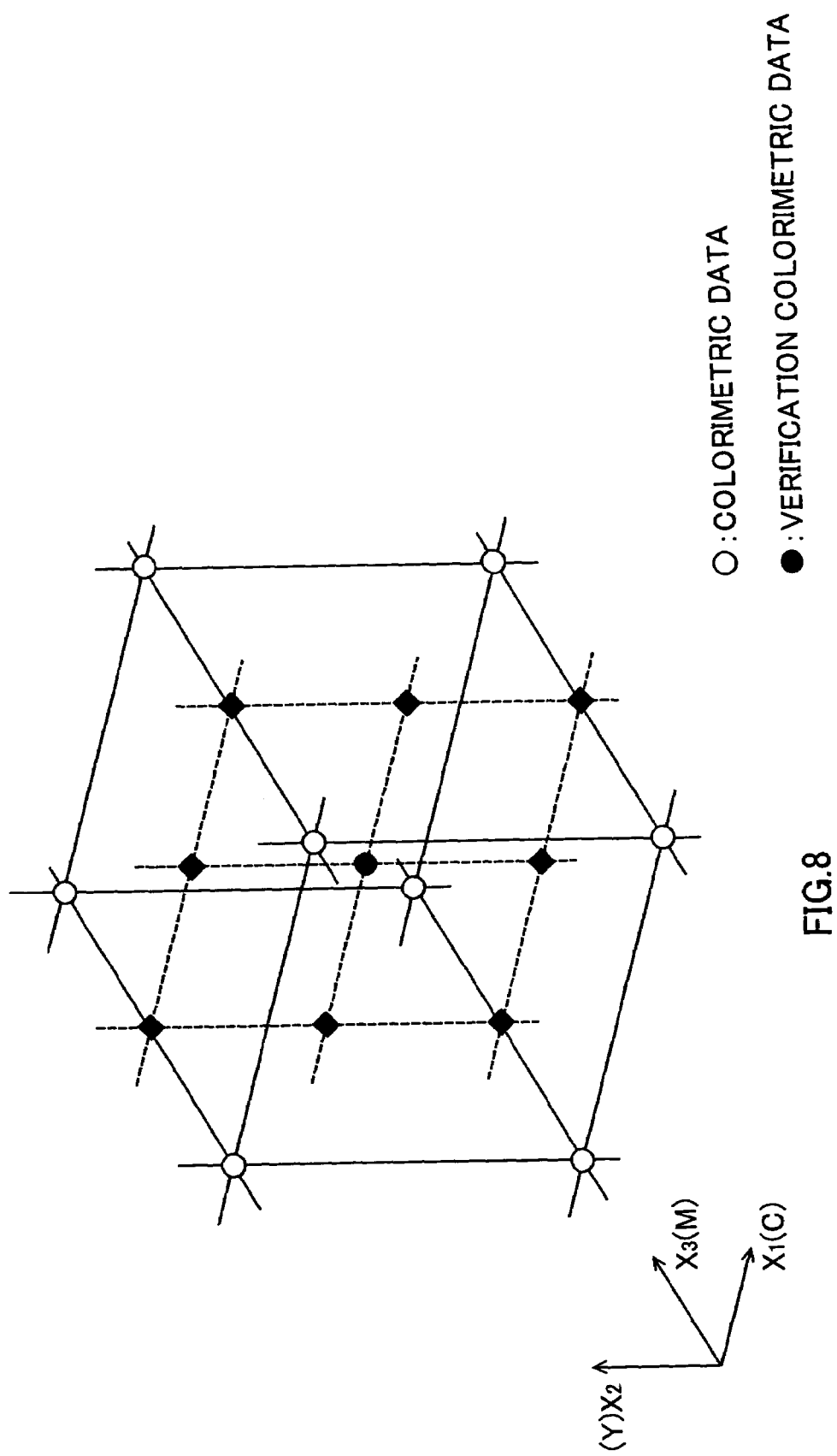
FIG. 8 is a drawing by which to explain the positional relationships between grid points.

Verification colorimetric data 17*b* is data comprising hypothetical CMY tone value sets for the midpoints between the orthogonal grid points in the hypothetical CMY space formed by the colorimetric data 17*a* that are associated with the colorimetric value sets therefor. The relationships between the grid points in the colorimetric data 17*a* and the grid points in the verification colorimetric data 17*b* are shown in FIG. 8. In other words, when the grid points indicated by white circles are formed by hypothetical CMY tone value sets established by the calorimetric data 17*a*, a hypothetical CMY tone value set established in the verification colorimetric data 17*b* corresponds to the black circles positioned in the center of the cube. In this embodiment, the grid points formed by the colorimetric data 17*a* in the hypothetical CMY space correspond to the first grid points, and the grid points formed in the hypothetical CMY space by the verification colorimetric data 17*b* correspond to the second grid points. However, in this Specification, for the sake of simplicity, the present invention is described using one dimension. It will then be demonstrated that the concepts used for this one dimension can be applied easily to a two-dimensional space, and finally, application to a three-dimensional space will be described.

Figure 6:
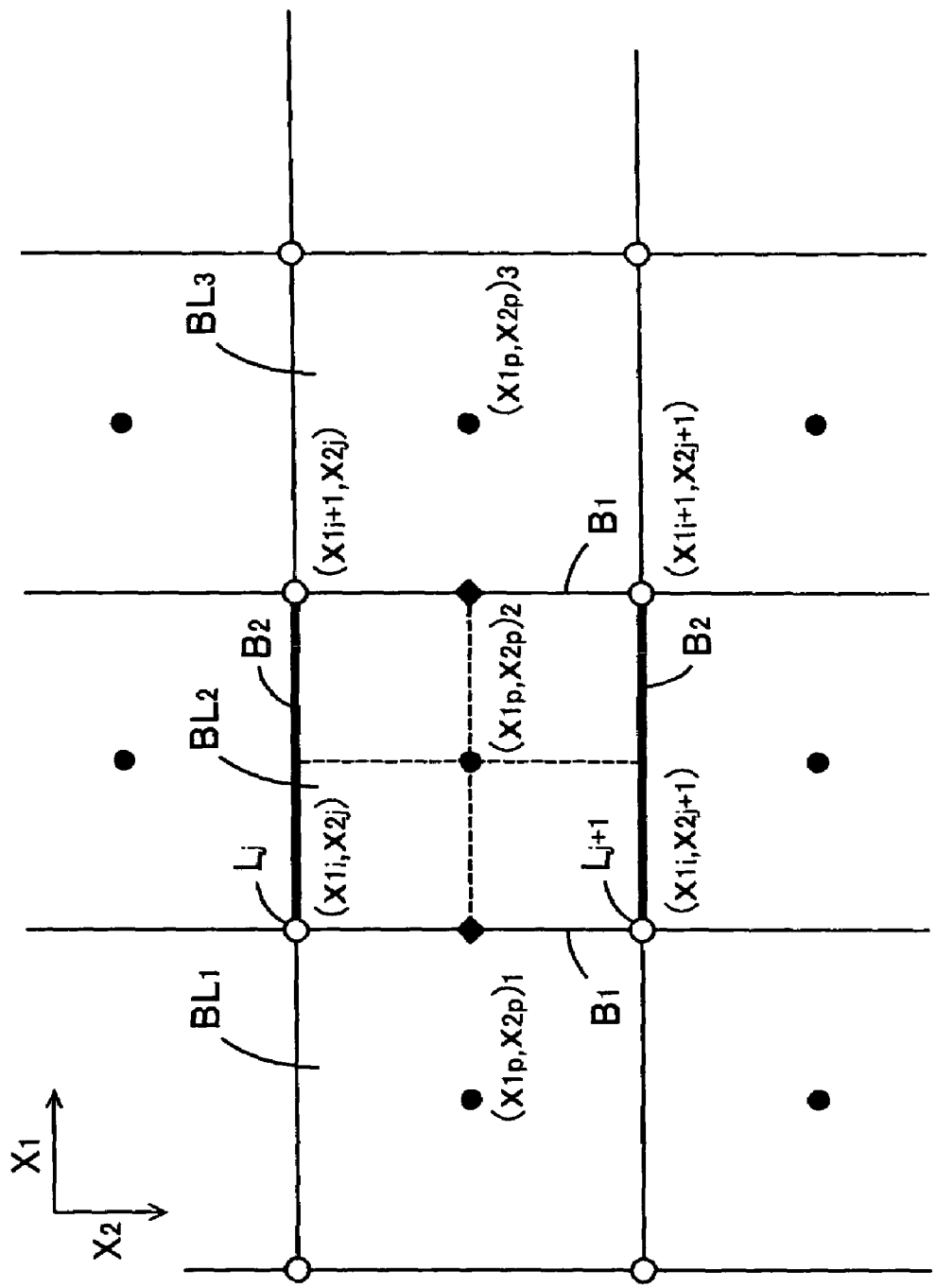
FIG. 6 is a drawing by which to explain the positional relationships between grid points.

FIG. 6 shows positional relationships between grid points for the colorimetric data 17*a* and grid points for the verification colorimetric data 17*b*. While the hypothetical CMY space is three-dimensional in the embodiment shown in FIG. 3, for the sake of simplicity, it is shown as a two-dimensional space in FIG. 6. In FIG. 6, the positions of the grid points for the hypothetical CMY tone value sets described in the colorimetric data 17*a* are indicated by white circles, while the positions of the grid points for the hypothetical CMY tone value sets described in the verification colorimetric data 17*b* are indicated by black circles. Because the grid points for the hypothetical CMY tone value sets in the verification colorimetric data 17*b* are in between the positions of the grid points for the colorimetric data 17*a*, in two dimensions, they correspond to the center points of the squares formed by the white circles, as shown by the black circles in FIG. 6.

In this embodiment, the derivative values used in subsequent interpolation are calculated in advance. The second-order derivative value calculation unit 20*a* of the LUT creation program 20 is a module that calculates these derivative values. The second-order derivative value calculation unit 20*a* obtains the colorimetric data 17*a* and the verification colorimetric data 17*b* (step S100), calculates the second-order derivative values from these data sets, and records the derivative values on the HDD 17 (step S105). More specifically, the grid points shown by white circles in FIG. 6 undergo derivative value calculation, and the derivative values can be calculated in the same fashion as when spline interpolation is carried out for the colorimetric value sets shown by white circles.

In other words, the second-order derivative value calculation unit 20*a* calculates the second-order derivative values included in the spline interpolation formula by solving the above the simultaneous equations (5) obtained from the boundary conditions for each grid point. The processing of step S105 is executed in each direction for all grid points in the colorimetric data 17*a* indicated by white circles in FIG. 6, and the results are recorded on the HDD 17 (as the second derivative data 17*c*). Furthermore, the second derivative calculation unit 20*a* calculates values that are obtained by performing second-order differentiation of each value first in one direction and then in the other direction. For example, it calculates a value by performing second-order differentiation of a dependent variable value $y_{ij}$ first in the $X_1$ direction and then in the $X_2$ direction.

In this Specification, these derivative values are termed cross-second-order derivative values. A cross-second-order derivative value can be calculated by substituting the dependent variables and second-order derivative values in the equation (5) with second-order derivative values and cross-second-order derivative values, respectively. In other words, where the second-order derivative values for the $X_1$ direction are deemed dependent variables, and if the one-dimensional spline function for the $X_2$ direction in order to calculated these dependent variables is considered, the second-order derivative values in this one-dimensional spline function are cross-second-order derivative values. For example, the second-order derivative value comprising the third term in the equation (1) is actually a value resulting from second-order differentiation of a dependent variable in the $X_1$ and $X_2$ directions. These cross-second-order derivative values are also calculated by the second-order derivative value calculation unit 20*a*, and the data indicating the calculation results is recorded on the HDD 17 as cross-second-order derivative value data 17*d*.

By using the second-order derivative value data 17*c*, the cross-second-order derivative value data 17*d* and the colorimetric data 17*a*, L*a*b* values for the grid point in each square having vertices indicated by white circles as shown in FIG. 6 can be calculated via spline interpolation. However, the present invention is an invention in which interpolation having higher accuracy than spline interpolation is carried out, such that the independent variables in the spline interpolation function are expressed using higher-order functions for the purpose of optimization.

(2-1) Correction and Optimization of Spline Interpolation Formula

The basic thinking behind optimization will now be described. Here, correction and optimization in connection with one-dimensional spline interpolation will first be described. The one-dimensional spline interpolation formula comprises the equations (1) through (3) as described above. In this spline interpretation formula, the equation (6) below is obtained by carrying out second-order differentiation of the equation (1). The details are discussed in *Numerical Recipes in C* (Japanese edition), Gijutsu Hyoronsha, Feb. 6, 2004, 11$^{th}$ printing, p. 105, for example.

$$y''=Ay''_j+By''_{j+1} \qquad (6)$$

With this spline interpolation formula, the applicants herein have realized a method for performing interpolation with higher accuracy than conventional spline interpolation by correcting (A) through (D) above. That is, in the equation (1), the relationships between independent and dependent variables in each interval can be defined by the quite sensible function form that the first- and second-order derivative values at the boundaries of the intervals are continuous. However, in each interval, the behavior of dependent variables between grid points is determined by the boundary conditions, and cannot be actively controlled. Accordingly, the applicants herein have provided a method that, by correcting (A) through (D) above, can more flexibly define the relationships between independent variables and dependent variables while satisfying the boundary conditions imposed by the spline interpretation formula.

Figure 7:
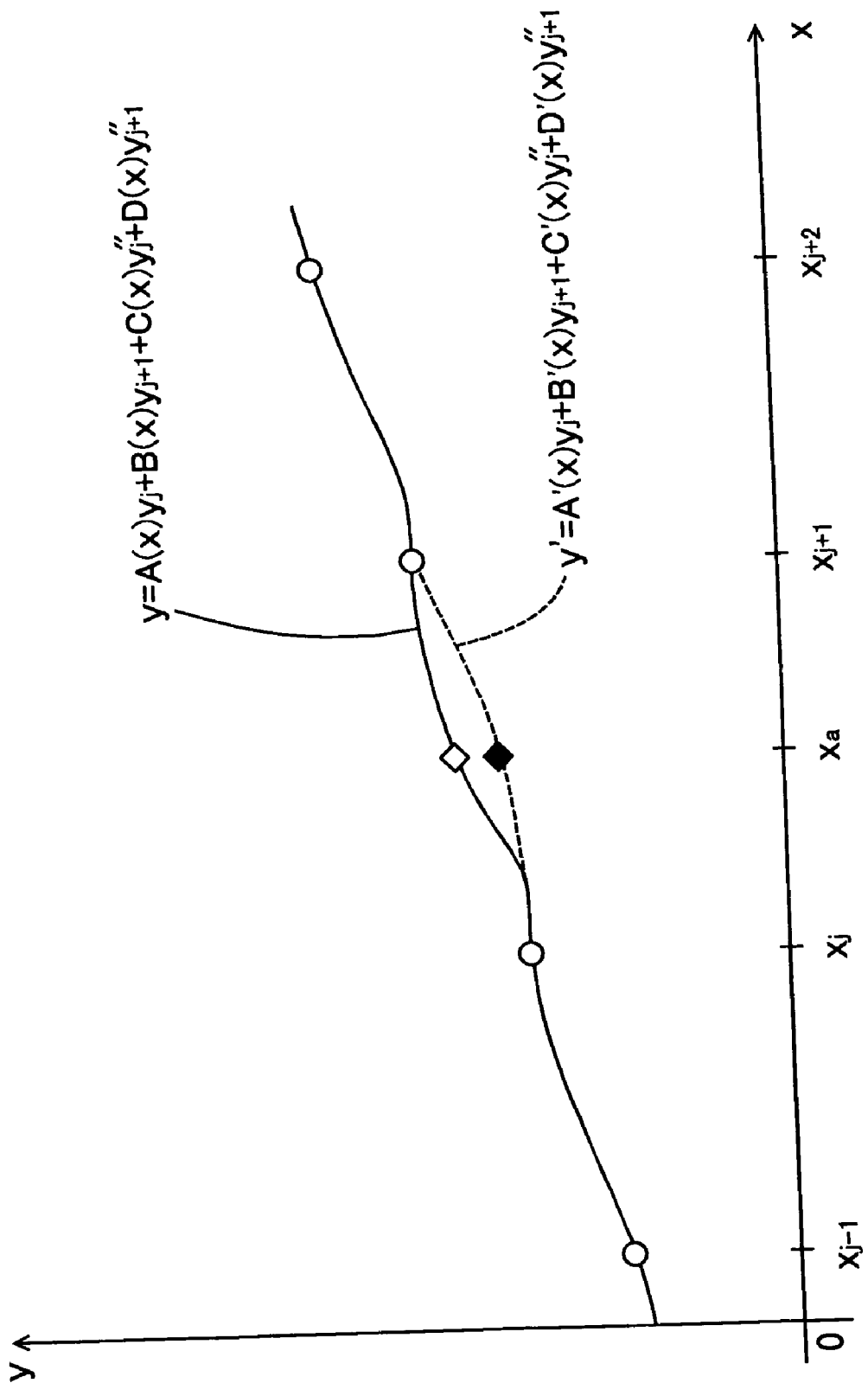
FIG. 7 is a drawing by which to explain high-accuracy interpolation.

FIG. 7 is an explanatory drawing describing the thinking behind the above principle. In the drawing, the abscissa axis represents the independent variable (x), while the longitudinal axis represents the dependent variable (y). Here, the spline function for the interval ($x_j$, $x_{j+1}$) is defined by the equation (1). For example, when the dependent variable obtained by spline interpolation over the interval ($x_j$, $x_{j+1}$) fluctuates as shown by the solid line in FIG. 7, this behavior is controlled by the boundary conditions for the spline function. Here, if the true value of the dependent variable at the position $x_a$ comprising the midpoint of the interval ($x_1$, $x_{j+1}$) in particular is indicated by the black diamond in FIG. 7 and the interpolation results using the spline function are indicated by the white diamond, interpolation accuracy at the position $x_a$ can decline.

Accordingly, the applicants herein performed correction of (A) through (D) so that the line representing the interpolation results would pass through (or travel as close as possible to) the true value indicated by the black diamond above. In other words, it was brought closer to the true value of the dependent variable, as indicated by the broken line, than the spline interpolation indicated by the solid line in FIG. 7. In this embodiment, the order of the independent variables included in (A) through (D) is increased as described below.

First, it will be demonstrated that the boundary conditions of the above spline interpolation formula are still satisfied while (A) through (D) are corrected. The correction of (A) through (D) is carried out via the equations (7) below.

$$A' = f(A) \qquad (7)$$
$$B' = 1 - A'$$
$$C' = \frac{1}{6}(A'^3 - A')(x_{j+1} - x_j)^2$$
$$D' = \frac{1}{6}(B'^3 - B')(x_{j+1} - x_j)^2$$

In other words, (A) in the equations (2) is deemed an unknown function A' (=f(A)), and this function f(A) undergoes optimization under various conditions.

In this correction as well in order to make the object missing the same as the above spline interpretation formula, the post-correction interpolation formula is expressed by the equation (8) below, and the second-order differentiation thereof is thought to satisfy the equation (9) below.

$$y = A'y_j + B'y_{j+1} + C'y''_j + D'y''_{j+1} \qquad (8)$$

$$y'' = A'y''_j + B'y''_{j+1} \qquad (9)$$

Here, because the boundaries of each interval comprise grid points within the space, and corresponding dependent variable values are equivalent to the colorimetric values described above (the colorimetric data 17a), these values are accurate values. Therefore, the conditions (1) and (2) below are satisfied so that the dependent variable values corresponding to grid points and the second-order derivative values calculated from dependent variable values will not be affected by the correction.

Condition 1: The dependent variable values for the grid points $L_j$, $L_{j+1}$ are the colorimetric values $y_j$, $y_{j+1}$.

Condition 2: The second-order derivative values for the grid points $L_j$, $L_{j+1}$ are the values $y''_j$, $y''_{j+1}$ calculated from the colorimetric values according to the above equation (5).

Furthermore, in order to enable interpolation to be carried out more accurately via the introduction of the above function f(A), it is ensured that the condition (3) is satisfied.

Condition 3: The interpolation results match the verification colorimetric data 17b.

If this condition (3) is applied strictly in all cases, there may be fluctuation in the obtained interpolation function, and the interpolation results may be unrealistic. Because it is not desirable to apply the condition (3) in such cases, unrealistic interpolation is prevented through the imposition of the constraint conditions described below.

In order to derive a conditional expression that will satisfy the condition (1), in the case where the independent variable (x) is $x_j$ regarding the equation (8), if A'=1, the relationship defined as 'when the independent variable (x) is $x_j$, the dependent variable (y) is $y_j$' is satisfied for a given grid point. Because it may be said that A=1 where the independent variable (x) is $x_j$, based on the equations (2), ultimately the first equation of the equations (10) below is obtained as the conditional expression for A'. Similarly, in the case where the independent variable (x) is $x_{j+1}$, A'=0 and A=0, and the second equation of the equations (10) below is obtained as the conditional expression for A'.

$$f(1) = 1$$
$$f(0) = 0 \qquad (10)$$

Next, if second-order differentiation of the equation (8) is performed in order to derive the conditional expression satisfying the above condition (2), the equations (11) below are obtained.

$$y'' = \frac{d^2 A'}{dx^2} y_j + \frac{d^2 B'}{dx^2} y_{j+1} + \frac{d^2 C'}{dx^2} y''_j + \frac{d^2 D'}{dx^2} y''_{j+1} \qquad (11)$$

$$\frac{d^2 A'}{dx^2} = \frac{1}{(x_{j+1} - x_j)^2} \cdot \frac{d^2 f(A)}{dA^2}$$

$$\frac{d^2 B'}{dx^2} = \frac{1}{(x_{j+1} - x_j)^2} \cdot \frac{d^2 f(A)}{dA^2}$$

$$\frac{d^2 C'}{dx^2} = A'\left(\frac{df(A)}{dA}\right)^2 + \frac{1}{6}(3A'^2 - 1)\frac{d^2 f(A)}{dA^2}$$

$$\frac{d^2 D'}{dx^2} = B'\left(\frac{df(A)}{dA}\right)^2 - \frac{1}{6}(3B'^2 - 1)\frac{d^2 f(A)}{dA^2}$$

Here, if the value obtained as a result of first-order differentiation of f(A) by A is 1 and the value obtained as a result of second-order differentiation of f(A) by A is 0, the equations (9) and (11) for a given dependent variable and its second-order derivative value match. Therefore, if it is arranged such that the value obtained as a result of first-order differentiation of f(A) by A is 1 and the value obtained as a result of second-order differentiation of f(A) by A is 0 when the independent variable (x) is $x_j$, $x_{j+1}$, the above condition (2) is satisfied. In other words, the conditional expressions to satisfy the condition (2) are the following equations (12).

$$\frac{df(1)}{dA} = \frac{df(0)}{dA} = 1 \qquad (12)$$

$$\frac{d^2 f(1)}{dA^2} = \frac{d^2 f(0)}{dA^2} = 0$$

Furthermore, in order to satisfy the condition (3), the following equation (13) must be satisfied when $x_p$ (where $x_p$ is a value that specifies a grid point position in the verification colorimetric data 17b) is substituted for the independent variable (x). Here, $y_p$ is a dependent variable comprising verification colorimetric data 17b.

$$y_p = A'y_j + B'y_{j+1} + C'y''_j + D'y''_{j+1} (x=x_p) \quad (13)$$

If the function f(A) that satisfies the conditions of the equations (10), (12) and (13) is defined as described above, interpolation can be expected to be carried out with higher accuracy than that offered by spline interpolation. The applicants herein have corrected the conventional spline interpretation on the assumption that this function f(A) is a polynomial expression, and have confirmed that if correction is carried out using this polynomial expression, interpolation accuracy is actually improved. When the function form is determined for f(A) assuming it is a polynomial expression, an order that can be calculated from the conditional expressions is set. In other words, because the above equations (10), (12) and (13) comprise seven conditional expressions, a sixth-order expression (14) that includes seven coefficients $k_0$-$k_6$ is assumed.

$$f(A) = k_6 A^6 + k_5 A^5 + k_4 A^4 + k_3 A^3 + k_2 A^2 + k_1 A + k_0 \quad (14)$$

Solving the coefficients $k_0$ through $k_5$ using the conditional expressions (10) and (12), $k_0=0$, $k_1=1$, $k_2=0$, $k_3=-k_6$, $k_4=3k_6$ and $k_5=-3k_6$ result. By substituting the obtained results in the equation (14) and substituting the obtained result in the equations (7) and (13), the equation by which to calculate the coefficient $k_6$ can be obtained. However, taking into consideration the fact that the application of the present invention is not limited to one dimension only but also multiple dimensions as in this embodiment, the coefficient $k_6$ will be calculated here via optimization.

While various optimization methods may be employed, in the method employed here, a target function (E) is introduced in order to prevent excessive non-linearity when the function f(A) is introduced, and this target function (E) is optimized while constraint conditions are imposed. In other words, because it is predicted that multiple values exist for the coefficient $k_6$ that satisfy the equation (13), the coefficient $k_6$ that minimizes the target function (E) is considered the ideal solution. While the above constraint conditions includes a condition to satisfy the above equation (13) (the constraint condition (1)), other constraint conditions may naturally be included as well. In this embodiment, optimization is carried out subject to the additional condition (the constraint condition (2)) that the function f(A) increases monotonously. Furthermore, various methods, such as a quasi-Newton method, may be used for this minimization, which is particularly useful when deriving the optimal solution for two or more dimensions as described below.

More specifically, first, when calculating A' that will satisfy the equation (13), a target function (E) is set that will bring the value of A included in the normal spline interpolation formula (1) as close as possible to the value of A' after correction (the equation (13)). The equation (15) below, for example, may be used as this target function.

$$E = (A_p - A'_p)^2 \quad (15)$$

Here, $A_p$ is a value obtained by substituting $x_p$ for the independent variable (x) in the first equation of the above equations (2). $A'_p$ in the equation (15) is a value obtained as a candidate for A' during the process of seeking the optimal solution. In other words, by seeking the solution for the equation (13), which is a third-order expression for A', so as to minimize this target function (E), $A'_p$ is narrowed down to the optimal value as the post-correction A'.

Once the optimal solution $A'_p$ is obtained, this optimal solution $A'_p$ and the values of the coefficients $k_0$ through $k_5$ are substituted in the above equation (14) and the expression is transformed. Then the coefficient $k_6$ for the independent variable $x_p$ can be calculated as shown in the equation (16) below.

$$k_6 = \frac{A'_p - A_p}{A_p^6 - 3A_p^5 + 3A_p^4 - A_p^3} \quad (16)$$

In this embodiment, it can be verified whether or not the above constraint condition (2) is satisfied after the coefficient $k_6$ is calculated. The above constraint condition (2) is a condition determined so that the function f(A) will increase monotonously, and by imposing this condition, failure of the interpolation results is prevented. In other words, the first and second terms of the spline interpolation equation (1) indicate the contribution for the linear interpolation portion, and (A) indicates the relationship between a given independent variable (x) and known independent variable values $x_j$, $x_{j+1}$, as is clear from the first equation of the equations (2).

Therefore, in the first term in the spline interpolation formula, the value of A changes in a linear fashion in response to changes in the independent variable (x). Here, after the above function f(A) is introduced, if A' (=f(A)) did not increase monotonously relative to (A), the post-correction function formula (13) would be significantly different in nature from the spline interpolation formula. In other words, if A' (=f(A)) did not increase monotonously relative to (A), multiple A's would exist for the same A, and the function would deviate significantly from the physical meaning of interpolation, wherein the contribution of a grid point diminishes as its distance from the target of interpolation increases. In this case, even if the function f(A) were sought, the formula would become unsuitable for interpolation, and a reasonable interpolation would not result.

In any case, when the optimal solution $A'_p$ for A' is calculated while imposing the above constraint conditions (1) and (2), the coefficient $k_6$ can be calculated while minimizing to the extent possible the nonlinearity of the function f(A) (i.e., while minimizing to the extent possible the complex dependence of f(A) on (A)). More specifically, the condition to ensure that the function f(A) increases monotonously is the condition that the first-order derivative value for (A) in f(A) is always a positive value, and is expressed by the equation (17) below.

$$\frac{df(A)}{dA} = k_6 3A^2(2A-1)(A-1)^2 + 1 > 0 \; (0 \le A \le 1) \quad (17)$$

Here, the formula that is multiplied by the coefficient $k_6$ in the above equation is deemed g(A).

This g(A) returns a value of zero when (A) is 0, 0.5 or 1, a negative value when (A) is between zero and 0.5, and a positive value when (A) is between 0.5 and 1. Therefore, g(A) returns the smallest negative value for a certain (A) between 0 and 0.5, and returns the largest positive value for a certain (A) between 0.5 and 1. Therefore, the above equation (17) can be rewritten as the expressions (18) below.

$$\begin{cases} k_6 < -\dfrac{1}{g(A)} & (0 < A < 0.5) \\ k_6 > -\dfrac{1}{g(A)} & (0.5 < A < 1) \end{cases} \quad (18)$$

Here, if the value of (A) that returns the minimum value of g(A) where 0<(A)<0.5 is deemed $A_{q1}$, and the value of (A) that returns the maximum value of g(A) where 0.5<(A)<1 is deemed $A_{q2}$, the expressions (18) can be further transformed into the expression (19).

$$-\dfrac{1}{g(A_{q2})} < k_6 < -\dfrac{1}{g(A_{q1})} \quad (19)$$

Because the minimum value of g(A) where 0<(A)<0.5 and the maximum value of g(A) where 0.5<(A)<1 are extreme values, $A_{q1}$ and $A_{q2}$ can be calculated by deeming the first-order derivative value of g(A) to be zero. Specifically, $A_{q1} = (5-5^{1/2})/10$, and $A_{q2} = (5+5^{1/2})/10$.

So long as the coefficient $k_6$ calculated via the equation (16) satisfies the constraint condition (2), it can be ensured that the function f(A) will increase monotonously. Accordingly, the coefficient $k_6$ is calculated after the optimal solution $A'_p$ is calculated and it is then checked whether or not the equation (16) is satisfied. While it is not guaranteed that both of the constraint conditions (1) and (2) are satisfied at all times, priority is given in this embodiment to the constraint condition (2). In other words, priority is placed on the function f(A) rising monotonously even if the interpolation results do not strictly match the verification colorimetric data 17b.

As a result, failure of the interpolation results is prevented. The amount of change in L*a*b* values relative to an increase in hypothetical CMY tone values is small for colors in low-brightness areas, and if there is fluctuation or a rapid change in the interpolation function, unreasonable interpolation results can easily occur. In other words, in low-brightness areas, because the value range over which dependent variables can change relative to changes in independent variables in particular is narrow, failure can easily occur due to the introduction of the function f(A). However, such failure can be reliably prevented by imposing the constraint condition (2).

(2-2) Expansion to a Two-Dimensional Space

The above description involved correction regarding one-dimensional spline interpolation, but the same concepts may be easily applied to spline interpolation in two or more dimensions. Accordingly, correction of spline interpolation in two dimensions will now be described. To do this, a two-dimensional spline interpolation formula will first be described. While two-dimensional spline interpolation may be carried out by repeating one-dimensional spline interpolation, in the present invention, processing to obtain interpolation values for a multidimensional space without repeating one-dimensional interpolation is executed, and this processing is termed accelerated spline interpolation.

In accelerated spline interpolation, when interpolation in multiple dimensions is to be performed, the interpolation formula to be used is sought in advance, and the second-order derivative values described above or the like are applied therein. This accelerated spline interpolation in a two-dimensional space is carried out using the colorimetric data 17a as well as second-order derivative values and cross-second-order derivative values for the grid points therein. This interpolation will be described here using the example of the two-dimensional space shown in FIG. 2. As expressed according to that example, a formula that can calculate the dependent variable value (y) for a given position $(x_1, x_2)$ surrounded by the grid point positions $(x_{1i}, x_{2j})$, $(x_{1i+1}, x_{2j})$, $(x_{1i}, x_{2j+1})$ and $(x_{1i+1}, x_{2j+1})$ from the positions of these grid points, their dependent variable values and second-order derivative values is calculated in advance.

Here, regarding spline interpolation in the $X_1$ direction, the dependent variable values for the positions $(x_1, x_{2j})$ and $(x_1, x_{2j})$ are given by the equations (20) and (21).

$$y1_j = A_1 y_{ij} + B_1 y_{i+1j} + C_1 \dfrac{\partial^2 y_{ij}}{\partial x_1^2} + D_1 \dfrac{\partial^2 y_{i+1j}}{\partial x_1^2} \quad (20)$$

$$y1_{j+1} = A_1 y_{ij+1} + B_1 y_{i+1j+1} + C_1 \dfrac{\partial^2 y_{ij+1}}{\partial x_1^2} + D_1 \dfrac{\partial^2 y_{i+1j+1}}{\partial x_1^2}$$

$$A_1 = \dfrac{x_{1i+1} - x_1}{x_{1i+1} - x_{1i}} \quad (21)$$

$$B_1 = \dfrac{x_1 - x_{1i}}{x_{1i+1} - x_{1i}}$$

$$C_1 = \dfrac{1}{6}(A_1^3 - A_1)(x_{1i+1} - x_{1i})^2$$

$$D_1 = \dfrac{1}{6}(B_1^3 - B_1)(x_{1i+1} - x_{1i})^2$$

On the other hand, considering spline interpolation in the $X_2$ direction using dependent variables and second-order derivative values for the positions $(x_1, x_{2j})$ and $(x_1, x_{2j+1})$, the dependent variable for the position $(x_1, x_2)$ is expressed by the equations (22) and (23).

$$y = A_2 y1_j + B_2 y1_{j+1} + C_2 \dfrac{\partial^2 y1_j}{\partial x_2^2} + D_2 \dfrac{\partial^2 y1_{j+1}}{\partial x_2^2} \quad (22)$$

$$A_2 = \dfrac{x_{2j+1} - x_2}{x_{2j+1} - x_{2j}} \quad (23)$$

$$B_2 = \dfrac{x_2 - x_{2j}}{x_{2j+1} - x_{2j}}$$

$$C_2 = \dfrac{1}{6}(A_2^3 - A_2)(x_{2j+1} - x_{2j})^2$$

$$D_2 = \dfrac{1}{6}(B_2^3 - B_2)(x_{2j+1} - x_{2j})^2$$

Here, the second-order derivative values of the third and fourth terms at the right-hand side of the equation (22) are the results of second-order differentiation of the equation (20) by $x_2$. By actually carrying out second-order differentiation, they can be defined by the equations (24).

$$\dfrac{\partial^2 y1_j}{\partial x_2^2} = A_1 \dfrac{\partial^2 y_{ij}}{\partial x_2^2} + B_1 \dfrac{\partial^2 y_{i+1j}}{\partial x_2^2} + C_1 \dfrac{\partial^4 y_{ij}}{\partial x_1^2 \partial x_2^2} + D_1 \dfrac{\partial^4 y_{i+1j}}{\partial x_1^2 \partial x_2^2} \quad (24)$$

$$\dfrac{\partial^2 y1_{j+1}}{\partial x_2^2} = A_1 \dfrac{\partial^2 y_{ij+1}}{\partial x_2^2} + B_1 \dfrac{\partial^2 y_{i+1j+1}}{\partial x_2^2} + C_1 \dfrac{\partial^4 y_{ij+1}}{\partial x_1^2 \partial x_2^2} + D_1 \dfrac{\partial^4 y_{i+1j+1}}{\partial x_1^2 \partial x_2^2}$$

Accordingly, when the equations (20) and (24) are substituted in the equation (22) and transformation is carried out, the equation (25) below is obtained.

$$y = A_1 A_2 y_{ij} + B_1 A_2 y_{i+1j} + A_1 B_2 y_{ij+1} + B_1 B_2 y_{i+1j+1} + C_1 A_2 \frac{\partial^2 y_{ij}}{\partial x_1^2} + \qquad (25)$$
$$D_1 A_2 \frac{\partial^2 y_{i+1j}}{\partial x_1^2} + C_1 B_2 \frac{\partial^2 y_{ij+1}}{\partial x_1^2} + D_1 B_2 \frac{\partial^2 y_{i+1j+1}}{\partial x_1^2} + A_1 C_2 \frac{\partial^2 y_{ij}}{\partial x_2^2} +$$
$$B_1 C_2 \frac{\partial^2 y_{i+1j}}{\partial x_2^2} + A_1 D_2 \frac{\partial^2 y_{ij+1}}{\partial x_2^2} + B_1 D_2 \frac{\partial^2 y_{i+1j+1}}{\partial x_2^2} +$$
$$C_1 C_2 \frac{\partial^4 y_{ij}}{\partial x_1^2 \partial x_2^2} + D_1 C_2 \frac{\partial^4 y_{i+1j}}{\partial x_1^2 \partial x_2^2} + C_1 D_2 \frac{\partial^4 y_{ij+1}}{\partial x_1^2 \partial x_2^2} + D_1 D_2 \frac{\partial^4 y_{i+1j+1}}{\partial x_1^2 \partial x_2^2}$$

This equation (25) includes only the grid point positions $(x_{1i}, x_{2j})$, $(x_{1i+1}, x_{2j})$, $(x_{1i}, x_{2j+1})$ and $(x_{1i+1}, x_{2j+1})$ and a given position $(x_1, x_2)$ surrounded by these grid points, as well as their dependent variable values, second-order derivative values and cross-second-order derivative values. Therefore, if these values are calculated in advance, the dependent variable values for the given position $(x_1, x_2)$ can be calculated by algebraic calculation.

In other words, in the two-dimensional space shown in FIG. 6, if the position of the smallest square grid having vertices indicated by white circles (the grid formed by the colorimetric data 17a) is defined in the same manner as the grid point positions shown in FIG. 2 above, the dependent variable values for a given position in this square grid can be calculated via the equation (25). Accordingly, in the present invention, by carrying out further correction of this accelerated spline interpolation formula, more accurate accelerated spline interpolation is carried out. This correction is shown in the equations (26) below.

$$A'_1 = f_1(A_1)$$
$$A'_2 = f_2(A_2) \qquad (26)$$

Here, the subscripts 1 and 2 correspond to the equations for the $X_1$ and $X_2$ directions in the same manner as in the equations (21) and (23), respectively. In other words, the first equation in the equations (26) represents correction of the first equation of the equations (21), while the second equation in the equations (26) represents correction of the first equation of the equations (23). As a result, (B) through (D) in each equation are also corrected, $A_1$-$D_1$ and $A_2$-$D_2$ in the equation (25) are corrected to $A'_1$-$D'_1$ and $A'_2$-$D'_2$, and the post-correction interpolation formula is expressed by the equation (27) below.

$$y = A'_1 A'_2 y_{ij} + B'_1 A'_2 y_{i+1j} + A'_1 B'_2 y_{ij+1} + B'_1 B'_2 y_{i+1j+1} + \qquad (27)$$
$$C'_1 A'_2 \frac{\partial^2 y_{ij}}{\partial x_1^2} + D'_1 A'_2 \frac{\partial^2 y_{i+1j}}{\partial x_1^2} + C'_1 B'_2 \frac{\partial^2 y_{ij+1}}{\partial x_1^2} +$$
$$D'_1 B'_2 \frac{\partial^2 y_{i+1j+1}}{\partial x_1^2} + A'_1 C'_2 \frac{\partial^2 y_{ij}}{\partial x_2^2} + B'_1 C'_2 \frac{\partial^2 y_{i+1j}}{\partial x_2^2} +$$
$$A'_1 D'_2 \frac{\partial^2 y_{ij+1}}{\partial x_2^2} + B'_1 D'_2 \frac{\partial^2 y_{i+1j+1}}{\partial x_2^2} + C'_1 C'_2 \frac{\partial^4 y_{ij}}{\partial x_1^2 \partial x_2^2} +$$
$$D'_1 C'_2 \frac{\partial^4 y_{i+1j}}{\partial x_1^2 \partial x_2^2} + C'_1 D'_2 \frac{\partial^4 y_{ij+1}}{\partial x_1^2 \partial x_2^2} + D'_1 D'_2 \frac{\partial^4 y_{i+1j+1}}{\partial x_1^2 \partial x_2^2}$$

Here as well, a sixth-order polynomial expression is assumed, and the equations (28) below are introduced using the coefficients $k_{11}$-$k_{16}$ for the direction $X_1$ and the coefficients $k_{21}$-$k_{26}$ for the direction $X_2$.

$$f_1(A_1) = k_{16}(A_1^6 - 3A_1^5 + 3A_1^4 - A_1^3) + A_1$$
$$f_2(A_2) = k_{26}(A_2^6 - 3A_2^5 + 3A_2^4 - A_2^3) + A_2 \qquad (28)$$

The target function (E) is then minimized so that the conditions described in the conditions (1) through (3) for one dimension described above will be satisfied. Here, the target function (E) for the two-dimensional space is expressed according to the equation (29) below, for example.

$$E = (A_{1p} - A'_{1p})^2 + (A_{2p} - A'_{2p})^2 \qquad (29)$$

Here, the values that specify a grid point position in the verification colorimetric data 17b are termed $(x_{1p}, x_{2p})$, $A_{1p}$ is a value obtained by substituting this $x_{1p}$ for the independent variable $x_1$ in the first equation of the equations (21), and $A_{2p}$ is a value obtained by substituting this $x_{2p}$ for the independent variable $x_2$ in the first equation of the equations (23). In addition, $A'_{1p}$, $A'_{2p}$ are values that are appropriately changed during optimization based on the condition (3), i.e., the condition that the interpolation result obtained from the substitution of $(x_{1p}, x_{2p})$ for the independent variables in the equation (27) matches the colorimetric value $y_p$ in the verification colorimetric data 17b.

When the post-optimization $A'_{1p}$ and $A'_{2p}$ are calculated using the above target function (E), the remaining coefficients can be calculated in accordance with the equations (30) below.

$$k_{16} = \frac{A'_{1p} - A_{1p}}{A_{1p}^6 - 3A_{1p}^5 + 3A_{1p}^4 - A_{1p}^3} \qquad (30)$$
$$k_{26} = \frac{A'_{2p} - A_{2p}}{A_{2p}^6 - 3A_{2p}^5 + 3A_{2p}^4 - A_{2p}^3}$$

Once the coefficients $k_{16}$ and $k_{26}$ are calculated as shown above, it is verified via the expressions (31) below, in the same manner as described above, whether or not the constraint condition (2) is satisfied.

$$-\frac{1}{g(A_{q2})} < k_{16} < -\frac{1}{g(A_{q1})} \qquad (31)$$
$$-\frac{1}{g(A_{q2})} < k_{26} < -\frac{1}{g(A_{q1})}$$

Here, $A_{q1}$ and $A_{q2}$ have the same values as shown in the above expression (19).

According to the above discussion, within the two-dimensional space shown in FIG. 6, using the smallest square grids (termed 'blocks') having white circles as vertices, the dependent variables for a given position in each of the square grids can be calculated with high accuracy. However, in the above correction, because the boundary conditions (i.e., the above conditions (1), (2)) are defined for each direction, the continuity of the interpolation results in two directions cannot be ensured based on only these conditions. Accordingly, in a space of two or more dimensions, by giving the coefficients $k_{16}$, $k_{26}$ positional dependence and making these coefficients continuous at block boundaries, the continuity of the results of interpolation via the equation (27) is assured.

Taking the coefficient $k_{26}$ as an example with reference to FIG. 6, the condition (1) applied during calculation of the coefficient $k_{26}$ is satisfied by the condition that the post-correction $A'_2$ on the boundary lines $B_2$ perpendicular to the $X_2$ direction (the bold lines in FIG. 6) matches the pre-correction $A_2$. The same is true for the condition (2) regarding derivative values, and the first and second-order derivative values of the post-correction $A'_2$ satisfy at the boundaries $B_2$ the same boundary condition as the condition governing the pre-correction spline interpolation function.

While the second equation of the above equations (28) is derived from the above conditions, because this second equation does not include a variable for the $X_1$ direction, the function does not necessarily continue at the boundaries $B_1$. For example, if $A_1$ is calculated from the independent variable $x_{1i}$ on one of the boundaries $B_1$, $A_1$ becomes 1, as does $A'1$. As a result, $B'_1=0$, $C'_1=0$, $D'_1=0$ result, and by substituting these values in the equation (27), the equation (32) below is obtained.

$$y = A'_2 y_{ij} + B'_2 y_{ij+1} + C'_2 \frac{\partial^2 y_{ij}}{\partial x_2^2} + D'_2 \frac{\partial^2 y_{ij+1}}{\partial x_2^2} \quad (32)$$

This equation reflects a situation in which the correction $A'_2$ is introduced to the one-dimensional spline interpolation in the $X_2$ direction. Therefore, if the coefficient $k_{26}$ calculated for the block $BL_1$ equals the coefficient $k_{26}$ calculated for the block $BL_2$, the values calculated via the equation (32) will be continuous at the border between the two blocks. However, because coefficient calculation via the above equation (30) is performed independently for each block, in general, it cannot be assumed that the coefficients $k_{26}$ for different blocks will match. This is also true for the coefficient $k_{16}$, and when this coefficient $k_{16}$ is determined using the first equation of the equations (30) based on the conditions (1) and (2), while the continuity of interpolation results at the boundaries $B_1$ can be assured, the continuity of interpolation results at the boundaries $B_2$ cannot be guaranteed.

Accordingly, in this embodiment, the continuity of interpolation results from the equation (27) is guaranteed by making the coefficients at the borders continuous where necessary after the coefficients $k_{16}$ and $k_{26}$ are determined based on the equations (30). Here, it is sufficient if the coefficient $k_{16}$ is continuous in the $X_2$ direction and the coefficient $K_{26}$ is continuous in the $X_1$ direction, as well as if the coefficient $k_{16}$ changes continuously based on the independent variable $x_2$ and the coefficient $k_{26}$ changes continuously based on the independent variable $x_1$. This is the same as saying that the coefficient $k_{16}$ changes continuously based on $A_2$ and the coefficient $k_{26}$ changes continuously based on $A_1$.

In order to satisfy the above continuity requirements, in this embodiment, the values of the coefficients $k_{16}$ and $k_{26}$ calculated via the equations (30) are deemed the values for a grid point in the verification colorimetric data 17b, and the coefficient values at the boundaries are calculated from these values with the definition that they change continuously toward the boundaries. For example, in order to have the coefficient $k_{26}$ change continuously based on $A_1$, the coefficient value at a boundary is calculated via interpolation from a coefficient already calculated in an adjacent block.

In the example shown in FIG. 6, where the coefficient $K_{26}$ has already been calculated for the positions $(x_{1p}, x_{2p})_1$, $(x_{1p}, x_{2p})_2$, $(x_{1p}, x_{2p})_3$ in the verification colorimetric data 17b for the blocks $BL_1$, $BL_2$, $BL_3$, the coefficient values for the boundary lines in between are calculated via interpolation. In other words, the coefficient $k_{26}$ for the boundary B1 for which the independent variable value is $x_{1i}$ is interpolated from the coefficient values calculated for the positions $(x_{1p}, x_{2p})_1$, $(x_{1p}, x_{2p})_2$, and the coefficient $k_{26}$ for the boundary B1 for which the independent variable value is $x_{1i+1}$ is interpolated from the coefficient values calculated for the positions $(x_{1p}, x_{2p})_2$, $(x_{1p}, x_{2p})_3$.

As a result, in the block $BL_2$, the value of the coefficient $k_{26}$ in the center position $(x_{1p}, x_{2p})$ and the coefficient values for the two boundary lines $B_1$ comprising either side and running in the $X_2$ direction are calculated. Accordingly, the coefficient $k_{26}$ is expressed by the equation (33), and the value of the function (h) in this equation (33) is assumed to match the coefficient values for the above positions.

$$h(A_1)=m_2 A_1^2 + m_1 A_1 + m_0 \quad (33)$$

In other words, the coefficient values for the positions $x_{1i}$, $x_{1p}$, $x_{1i+1}$ in the $X_1$ direction are deemed $k_{26i}$, $k_{26p}$, $k_{26i+1}$, and the positions $x_{1i}$, $x_{1p}$, $x1_{i+1}$ are respectively substituted in $A_1$ of the equation (33) above. If the respective left-hand sides of the equations obtained this way are deemed equal to the coefficient values $k_{26i}$, $k_{26p}$, $k_{26i+1}$, three simultaneous equations can be obtained, and the coefficients $m_0$-$m_2$ can be calculated based thereon.

If the coefficient $k_{26}$ is defined such that it is continuous at the boundaries as described above, the dependent variable on a boundary defined in the above equation (32) has the same value regardless of which of the two blocks that include that boundary is used during calculation, and continuity is therefore assured. In the case of two dimensions, the function $h(A_2)$ dependent on the variable $A_2$ is defined in the same way as in the above equation (33), and the same processing is carried out to the coefficient $k_{16}$ as well. As a result, the interpolation formula is defined such that the post-correction equation (27) interpolation results are continuous at block boundaries.

The basic thinking of the present invention is that the spline interpolation formula calculated using the colorimetric data 17a as indicated above is corrected based on the verification colorimetric data 17b. In order to carry out this correction, the equation (16) or equations (30), or equations equivalent thereto for three dimensions, should be obtained. Accordingly, in this embodiment shown in FIG. 3, the spline interpolation formula data 17e and the target function data 17f are prepared in advance to carry out the processing described above.

Here, the spline interpolation formula data 17e is a post-correction interpolation formula. It consists of data indicating a formula equivalent to the equation (13) in the case of one dimension and the equation (27) in the case of two dimensions, and comprises data indicating a formula that can obtain an interpolation result (dependent variable value) via algebraic computation of independent variable values, dependent variable values and second-order derivative values (including cross-second-order derivative values) for grid points and a given independent variable. However, in this data, the highest-order coefficient for the correction via a polynomial expression (in the case of one dimension, the coefficient $k_6$; in the case of two dimensions, the coefficients $k_{16}$ and $k_{26}$) are undetermined.

The target function data 17f is data indicating a formula necessary to determine these coefficients, and in this embodiment, includes an equation indicating the target function (E), an equation or equations to calculate the coefficient(s), and an expression or expressions indicating a constraint condition or conditions. For example, in the case of one dimension, it comprises data indicating a formula comprising the equations (15) and (16) and the expression (19), and in the case of two dimensions, it comprises data a formula comprising the equations (29) and (30) and the expression (31). It also includes data indicating an equation equivalent to the equation (33) that ensures continuity of the interpolation results in the case of two or more dimensions. The above constraint condition (1) can be expressed by substituting a grid point position in the verification colorimetric data 17$b$ for an independent variable in the spline interpolation formula data 17$e$. Therefore, the optimization described above can be carried out via the above spline interpolation formula data 17$e$ and target function data 17$f$.

The target function calculation unit 20$c$ optimizes (A) through (D) above in the spline interpolation formula for each block with reference to these data sets. In other words, it calculates the coefficient values for each block. To do this, the block setting unit 20$b$ first sets a target block to be processed based on the calorimetric data 17$a$. In the case of the two-dimensional situation shown in FIG. 6, this block is the smallest square block formed by grid points comprising the hypothetical CMY tone value sets of the colorimetric data 17$a$, and is the smallest square block formed by white circles. In other words, the block setting unit 20$b$ obtains the colorimetric data 17$a$, forms blocks based on hypothetical CMY tone value grid points, and sets the first block in a prescribed sequence as the target block to undergo processing (step S115).

The target function calculation unit 20$c$ minimizes the target function (E) for each target block and calculates the number of coefficients (k) equal to the number of dimensions in the color space in the colorimetric data (steps S120-S135). In step S120, the target function calculation unit 20$c$ substitutes the current variable value A' in the equations (15) or (29) with reference to the target function data 17$f$ in order to calculate the value of the target function (E). Because the variable value A' is updated through this repetitive processing, a prescribed initial value is deemed the variable value A' in step S120 at the outset of the repetitive processing, and the value obtained through a prescribed optimization algorithm is deemed the variable value A' in the second and subsequent processing sessions.

Once the value of the target function (E) is calculated in step S120, a coefficient calculation equation or equations equivalent to the equation (16) or equations (30) are obtained with reference to the above target function data 17$f$ in step S122 and the above coefficient (k) is calculated by substituting the current variable value A'. Next, a constraint condition equivalent to the expression (19) or expressions (31) (i.e., the constraint condition (2)) is obtained in step S125 with reference to the target function data 17$f$, and it is then determined whether the coefficient (k) obtained in step S122 satisfies this constraint condition.

If it is not determined in step S125 that the coefficient (k) satisfies this constraint condition, step S130 is skipped and the processing of step S135 is performed. If it is determined in step S125 that the coefficient (k) satisfies this constraint condition, it is determined in step S130 whether or not the target function (E) has been optimized. In order to determine whether or not optimization has occurred, i.e., whether or not the target function (E) has been minimized, various types of determination may be used. (See, for example, *Numerical Recipes in C* (Japanese edition), Gijutsu Hyoronsha, pp. 282-338.)

If it is not determined in step S130 that the target function (E) has been optimized, the optimization processing unit 20$d$ updates the variable value A' in step S135. In other words, the optimization processing unit 20$d$ is a module that updates the variable value A' and carries out optimization. It obtains an equation equivalent to the above equation (13) or (27) with reference to the spline interpolation formula data 17$e$, obtains a constraint condition (1) by substituting a grid point position in the verification colorimetric data in the target block with reference to the verification colorimetric data 17$b$, and changes the variable value A' within the range that satisfies this constraint condition (1). In this embodiment, if a variable A' that satisfies both of the constraint conditions (1) and (2) at the same time cannot be calculated, priority is given to the constraint condition (2), as described above. For example, if a coefficient that satisfies the constraint conditions (1) and (2) simultaneously is not found by repeating processing for a prescribed number of times, a coefficient (k) is determined that satisfies the constraint condition (2) and enables the smallest target function (E) to be obtained.

Where the coefficient (k) is determined in this fashion, as well as where it is determined in step S130 that the target function (E) was optimized, the current coefficient (k) is recorded temporarily in the RAM 15 (step S140). Once the coefficient (k) is recorded, it is determined whether the above processing has been performed for all blocks (step S145), and processing is repeated until it is determined that processing has been performed for all blocks. In other words, if it is not determined in step S145 that processing has been executed for all blocks, the target block is changed to an unprocessed block (step S150), and the processing beginning with step S120 is repeated. The above sequence of operations is merely an example, and various different processing sequences may be used so long as correction to minimize the target function (E) can be carried out.

Furthermore, in order to ensure the continuity of interpolation results, the optimization processing unit 20$d$ obtains the same number of equations equivalent to the equation (33) to be satisfied by the coefficients as there are dimensions, with reference to the above target function data 17$f$. It then calculates coefficients corresponding to the boundaries of blocks for which coefficients have already been calculated, using an interpolation formula such as linear interpolation, and then, using the obtained boundary coefficient values and coefficient values calculated for grid point positions in the verification colorimetric data 17$b$, calculates the coefficients $m_0$-$m_2$ for an equation equivalent to the equation (33) via simultaneous .equations (step S155). Naturally, coefficients are calculated for the same number of functions (h) as there are dimensions. Through the above processing, coefficients for expressions equivalent to the polynomial equation indicating correction of the spline interpolation formula (in the case of one dimension, the equation (14); in the case of two dimensions, the equations (28)) are all calculated, enabling highly accurate interpolation processing to be performed. The polynomial equation data is recorded on the HDD 17 as optimization polynomial data 17$g$ (step S160). In this embodiment, the processing of step S100 comprises the processing to obtain output color data, and the processing of steps S105-S160 comprises the interpolation function correction processing.

The accelerated spline interpolation unit 20$e$ and LUT creation unit 20$f$ create a LUT in the steps commencing with the step 170. To do this, first, the LUT creation unit 20$f$ derives grid points to be registered in the LUT from the hypothetical CMY color space (step S170). Here, grid points determined in advance may be derived, and if $17^3$ sets of data are to be registered as in the example of FIG. 1, the hypothetical CMY tone value ranges are divided equally into 16 parts, for example, and the obtained 17 tone values for each CMY color component may be freely combined. In this Specification, these grid points are termed LUT grid points.

Once these LUT grid points are derived from the hypothetical CMY space, one of them is selected (step S175), and accelerated spline interpolation that includes correction using a polynomial expression is carried out in steps S180-S188. First, in order to carry out accelerated spline interpolation, the accelerated spline interpolation unit 20e obtains from the HDD 17 the colorimetric data 17a, the verification colorimetric data 17b, the second-order derivative value data 17c, the cross-second-order derivative value data 17d, the spline interpolation formula data 17e and the optimization polynomial data 17g (step S180). As a result, accelerated spline interpolation can be carried out for a given position based on the formula indicated by the spline interpolation formula data 17e subjected to correction using the optimization polynomial data 17g.

Once the various types of data are obtained in step S180, dependent variable values (L*a*b* values) corresponding to the LUT grid point selected for processing are calculated via the accelerated spline interpolation formula reflecting correction. According to this interpolation processing, dependent variables corresponding to the hypothetical CMY tone values for a LUT grid point (L*a*b* values) can be obtained. Accordingly, the LUT creation unit 20f temporarily records the association in the RAM 15 (step S184). The calculation for this association is carried out for all of the above LUT grid points. In other words, the LUT creation unit 20f determines whether or not processing has been completed for all LUT grid points (step S186), and if it is not determined that processing for all LUT grid points has been completed, the processing target is changed to an unprocessed LUT grid point (step S188) and the operations beginning with step S180 are repeated.

If it is determined in step S186 that processing has been completed for all grid points, because this means that the associations between the hypothetical CMY tone value sets and the L*a*b* value sets for all LUT grid points have been defined, the LUT creation unit 20f converts the hypothetical CMY tone values into CMYKlclm data based on the separation rules determined in advance. A LUT that associates the post-conversion CMYKlclm data with L*a*b* value sets is then created and recorded on the HDD 17 as a LUT 17h (step S190). In this embodiment, the steps S170-S190 comprise operations to generate a profile.

(2-3) Expansion to Three-Dimensional Space

In the above example, mainly a two-dimensional space was described, but expansion to three or more dimensions can be easily done. Therefore, the technology described using the above example can be applied in a number of dimensions to carry out high-accuracy, high-speed interpolation, and a LUT capable of highly accurate color conversion can be created. Here, expansion to a three-dimensional space as in the case of the colorimetric data 17a shown in FIG. 3 will be described.

FIG. 8 is an explanatory drawing describing blocks, colorimetric data 17a and verification colorimetric data 17b in a three-dimensional space. In other words, in actuality the colorimetric data 17a comprises tone value sets in the hypothetical CMY space, which is a three-dimensional space. In the drawing, the grid points in the colorimetric data 17a are shown as white circles and one of the grid points in the verification colorimetric data 17b is shown as a black circle. As shown in the drawing, in the hypothetical CMY space, the colorimetric data 17a grid points form cubes (i.e., a cubic lattice), and the verification colorimetric data 17b grid points are positioned in the centers of the cubes. The smallest cube formed by only the colorimetric data 17a grid points comprises a block in the three-dimensional space.

At this point, accelerated spline interpolation formula shown via the equation (34) is subjected to correction.

$$y = A_1A_2A_3 y_{ijk} + B_1A_2A_3 y_{i+1jk} + A_1B_2A_3 y_{ij+1k} + \quad (34)$$
$$B_1B_2A_3 y_{i+1j+1k} + A_1A_2B_3 y_{ijk+1} + B_1A_2B_3 y_{i+1jk+1} +$$
$$A_1B_2B_3 y_{ij+1k+1} + B_1B_2B_3 y_{i+1j+1k+1} + C_1A_2A_3 \frac{\partial^2 y_{ijk}}{\partial x_1^2} +$$
$$D_1A_2A_3 \frac{\partial^2 y_{i+1jk}}{\partial x_1^2} + C_1B_2A_3 \frac{\partial^2 y_{ij+1k}}{\partial x_1^2} + D_1B_2A_3 \frac{\partial^2 y_{i+1j+1k}}{\partial x_1^2} +$$
$$C_1A_2B_3 \frac{\partial^2 y_{ijk+1}}{\partial x_1^2} + D_1A_2B_3 \frac{\partial^2 y_{i+1jk+1}}{\partial x_1^2} +$$
$$C_1B_2B_3 \frac{\partial^2 y_{ij+1k+1}}{\partial x_1^2} + D_1B_2B_3 \frac{\partial^2 y_{i+1j+1k+1}}{\partial x_1^2} +$$
$$A_1C_2A_3 \frac{\partial^2 y_{ijk}}{\partial x_2^2} + B_1C_2A_3 \frac{\partial^2 y_{i+1jk}}{\partial x_2^2} + A_1D_2A_3 \frac{\partial^2 y_{ij+1k}}{\partial x_2^2} +$$
$$B_1D_2A_3 \frac{\partial^2 y_{i+1j+1k}}{\partial x_2^2} + A_1C_2B_3 \frac{\partial^2 y_{ijk+1}}{\partial x_2^2} + B_1C_2B_3 \frac{\partial^2 y_{i+1jk+1}}{\partial x_2^2} +$$
$$A_1D_2B_3 \frac{\partial^2 y_{ij+1k+1}}{\partial x_2^2} + B_1D_2B_3 \frac{\partial^2 y_{i+1j+1k+1}}{\partial x_2^2} +$$
$$C_1C_2A_3 \frac{\partial^4 y_{ijk}}{\partial x_1^2 \partial x_2^2} + D_1C_2A_3 \frac{\partial^4 y_{i+1jk}}{\partial x_1^2 \partial x_2^2} + C_1D_2A_3 \frac{\partial^4 y_{ij+1k}}{\partial x_1^2 \partial x_2^2} +$$
$$D_1D_2A_3 \frac{\partial^4 y_{i+1j+1k}}{\partial x_1^2 \partial x_2^2} + C_1C_2B_3 \frac{\partial^4 y_{ijk+1}}{\partial x_1^2 \partial x_2^2} + D_1C_2B_3 \frac{\partial^4 y_{i+1jk+1}}{\partial x_1^2 \partial x_2^2} +$$
$$C_1D_2B_3 \frac{\partial^4 y_{ij+1k+1}}{\partial x_1^2 \partial x_2^2} + D_1D_2B_3 \frac{\partial^4 y_{i+1j+1k+1}}{\partial x_1^2 \partial x_2^2} +$$
$$A_1A_2C_3 \frac{\partial^2 y_{ijk}}{\partial x_3^2} + B_1A_2C_3 \frac{\partial^2 y_{i+1jk}}{\partial x_3^2} + A_1B_2C_3 \frac{\partial^2 y_{ij+1k}}{\partial x_3^2} +$$
$$B_1B_2C_3 \frac{\partial^2 y_{i+1j+1k}}{\partial x_3^2} + A_1A_2D_3 \frac{\partial^2 y_{ijk+1}}{\partial x_3^2} + B_1A_2D_3 \frac{\partial^2 y_{i+1jk+1}}{\partial x_3^2} +$$
$$A_1B_2D_3 \frac{\partial^2 y_{ij+1k+1}}{\partial x_3^2} + B_1B_2D_3 \frac{\partial^2 y_{i+1j+1k+1}}{\partial x_3^2} +$$
$$C_1A_2C_3 \frac{\partial^4 y_{ijk}}{\partial x_1^2 \partial x_3^2} + D_1A_2C_3 \frac{\partial^4 y_{i+1jk}}{\partial x_1^2 \partial x_3^2} + C_1B_2C_3 \frac{\partial^4 y_{ij+1k}}{\partial x_1^2 \partial x_3^2} +$$
$$D_1B_2C_3 \frac{\partial^4 y_{i+1j+1k}}{\partial x_1^2 \partial x_3^2} + C_1A_2D_3 \frac{\partial^4 y_{ijk+1}}{\partial x_1^2 \partial x_3^2} + D_1A_2D_3 \frac{\partial^4 y_{i+1jk+1}}{\partial x_1^2 \partial x_3^2} +$$
$$C_1B_2D_3 \frac{\partial^4 y_{ij+1k+1}}{\partial x_1^2 \partial x_3^2} + D_1B_2D_3 \frac{\partial^4 y_{i+1j+1k+1}}{\partial x_1^2 \partial x_3^2} A_1C_2C_3 \frac{\partial^4 y_{ijk}}{\partial x_2^2 \partial x_3^2} +$$
$$B_1C_2C_3 \frac{\partial^4 y_{i+1jk}}{\partial x_2^2 \partial x_3^2} + A_1D_2C_3 \frac{\partial^4 y_{ij+1k}}{\partial x_2^2 \partial x_3^2} + B_1D_2C_3 \frac{\partial^4 y_{i+1j+1k}}{\partial x_2^2 \partial x_3^2} +$$
$$A_1C_2D_3 \frac{\partial^4 y_{ijk+1}}{\partial x_2^2 \partial x_3^2} + B_1C_2D_3 \frac{\partial^4 y_{i+1jk+1}}{\partial x_2^2 \partial x_3^2} +$$
$$A_1D_2D_3 \frac{\partial^4 y_{ij+1k+1}}{\partial x_2^2 \partial x_3^2} + B_1D_2D_3 \frac{\partial^4 y_{i+1j+1k+1}}{\partial x_2^2 \partial x_3^2} +$$
$$C_1C_2C_3 \frac{\partial^6 y_{ijk}}{\partial x_1^2 \partial x_2^2 \partial x_3^2} + D_1C_2C_3 \frac{\partial^6 y_{i+1jk}}{\partial x_1^2 \partial x_2^2 \partial x_3^2} +$$
$$C_1D_2C_3 \frac{\partial^6 y_{ij+1k}}{\partial x_1^2 \partial x_2^2 \partial x_3^2} + D_1D_2C_3 \frac{\partial^6 y_{i+1j+1k}}{\partial x_1^2 \partial x_2^2 \partial x_3^2} +$$
$$C_1C_2D_3 \frac{\partial^6 y_{ijk+1}}{\partial x_1^2 \partial x_2^2 \partial x_3^2} + D_1C_2D_3 \frac{\partial^6 y_{i+1jk+1}}{\partial x_1^2 \partial x_2^2 \partial x_3^2} +$$
$$C_1D_2D_3 \frac{\partial^6 y_{ij+1k+1}}{\partial x_1^2 \partial x_2^2 \partial x_3^2} + D_1D_2D_3 \frac{\partial^6 y_{i+1j+1k+1}}{\partial x_1^2 \partial x_2^2 \partial x_3^2}$$

Here, the positions indicated by white circles as described above are deemed (i, j, k), (i+1, j, k), (i, j+1, k), (i+1, j+1, k), (i, j, k+1), (i+1, j, k+1), (i, j+1, k+1), (i+1, j+1, k+1). In addition, the coefficients in each direction for the independent variables ($x_1$, $x_2$, $x_3$) are deemed $A_1$-$D_1$, $A_2$-$D_2$ and $A_3$-$D_3$. Therefore, following correction in accordance with the present invention, $A_1$-$D_1$, $A_2$-$D_2$ and $A_3$-$D_3$ in the equation (34) are expressed as $A'_1$-$D'_1$, $A'_2$-$D'_2$ and $A'_3$-$D'_3$.

Correction is carried out to each independent variable ($x_1$, $x_2$, $x_3$) in analogy with the equation (14). The target function (E) can be formed by incorporating the number of dimensions of the independent variables in the same manner as Equation (15). Coefficient calculation may also involve carrying out calculation in accordance with the equation (16) for the number of dimensions represented by the independent variables, and the equation (19) can be used as the condition comprising the constraint condition (2). Naturally, the condition comprising the constraint condition (1) can be calculated from the equation (34) and the verification colorimetric data 17b.

Once optimization is performed and the coefficients are calculated, the coefficients are given positional dependency and made continuous at the block boundaries, thereby ensuring the continuity of the results of interpolation obtained via the equation (34). With respect to the coefficient $k_{b6}$ calculated for a given independent variable $x_b$, the function (h) that defines the coefficient can be defined such that it depends on two independent variables other than this independent variable. For example, the coefficient $k_{36}$ calculated for the independent variable $x_3$ defines the function (h) as shown in the equation (35) below.

$$h(A_1, A_2) = m_{22}A_1^2A_2^2 + m_{12}A_1A_2^2 + m_{02}A_2^2 + \\ m_{21}A_1^2A_2 + m_{11}A_1A_2 + m_{01}A_2 + m_{20}A_1^2 + m_{10}A_1 + m_{00}$$ (35)

Here, the function (h) comprises the function resulting from multiplying the coefficient $m_{ij}$ (where (i) and (j) are natural numbers from 0 to 2) by each term in the function calculated via $(A_1^2+A_1+1)\times(A_2^2+A_2+1)$. Therefore, where there are N dimensions, a function resulting from multiplying the polynomial expression $(A_1^2+A_1+1)^{N-1}$ by the coefficient (m) may be assumed. In the case of the function shown by the equation (35), there are nine undetermined coefficients $m_{ij}$, and because the coefficients $k_{36}$ for the grid point positions in the verification colorimetric data 17b as shown in FIG. 8 have already been calculated, if the coefficient values at the positions on the surface that is perpendicular to the $x_3$ axis (the axis running in the $X_3$ direction) and intersects with block boundaries (for example, the position indicated by the black diamonds in FIG. 8) are calculated, the coefficients $m_{ij}$ in the equation (35) can be determined from these nine coefficient values.

Naturally, the coefficients for the independent variables $x_1$, $x_2$ can also be calculated in the same manner. If the coefficient values can be calculated as described above, because the nature of the correction to be introduced to the accelerated spline interpolation is established, interpolation regarding a given position can be performed with high speed and high accuracy. Therefore, a LUT 17h that can carry out color conversion with high accuracy can be created.

(2-4) Color Conversion Process Based on Created Color Conversion Table Data

Figure 9:
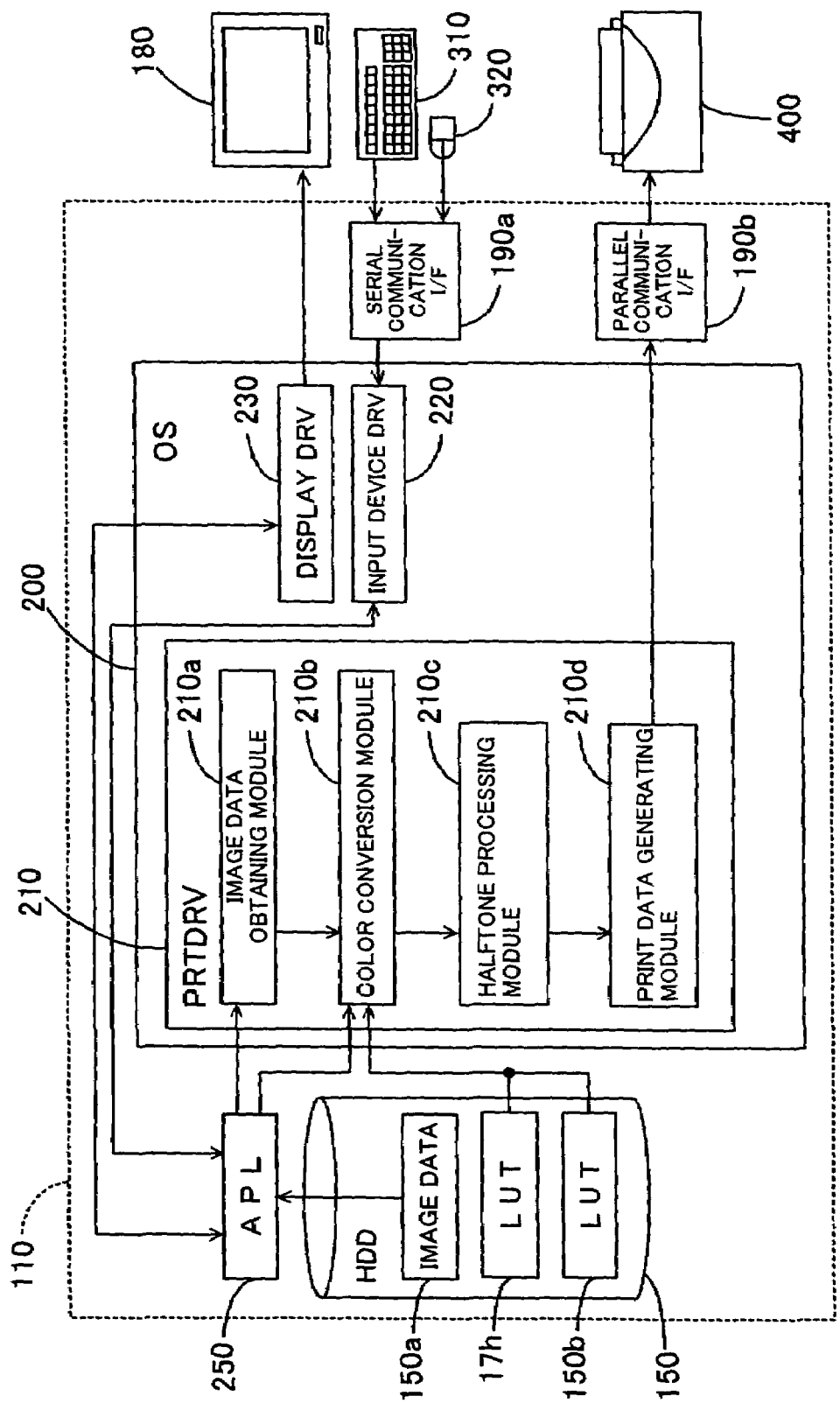
FIG. 9 is a block diagram showing an example of the construction of a computer that uses a LUT.

The LUT created as described above is used for ordinary printing performed by a commonly-used computer. FIG. 9 is a block diagram showing an example of the construction of a computer that uses this LUT during printing. The computer 110 is a general-use personal computer, and the OS 200 thereof incorporates a printer driver (PRTDRV) 210, an input device driver (DRV) 220 and a display device driver (DRV) 230. The display DRV 230 is a driver that controls the display of such things as the image data in the display, and the input device DRV 220 is a driver that receives prescribed input operations by receiving code signals from the keyboard 310 or the mouse 320 input via the serial communication I/F 190a.

The APL 250 is an application program that can carry out editing of color images or the like, and the user can print these color images via a printing apparatus 400 by operating the above operation input devices with this APL 250 executed. The LUT created via the present invention is referred to during printing of these color images. The image data 150a indicating the images to be created by the APL 250 is dot-matrix data that expresses RGB color components by tone according to the sRGB standard. It is stored on an HDD 150.

In order to execute printing, the above PRTDRV 210 includes an image data obtaining module 210a, a color conversion module 210b, a halftone processing module 210c and a print data generating module 210d. Furthermore, the LUT 17h created according to the present invention and the LUT 150b that converts sRGB data into L*a*b* data are saved on the HDD 150. When the operator issues a print command while the APL 250 is running, the image data 150a for printing is obtained by the image data obtaining module 210a, which then starts the color conversion module 210b.

The color conversion module 210b is a module that converts sRGB data into CMYKlclm data and converts given sRGB data into L*a*b* data via interpolation with reference to the LUT 150b. It further converts the L*a*b* data into CMYKlclm data via interpolation with reference to the LUT 17h. In other words, the color conversion module 210b converts a given grid point (i.e., a set of color component values) in the sRGB color system into a grid point (i.e., a set of color component values) in the CMYKlclm data color system used by the printing apparatus.

When the color conversion module 210b carries out color conversion and generates CMYKlclm data, this CMYKlclm data is transferred to the halftone processing module 210c. The halftone processing module 210c converts the CMYKlclm data for each dot into lower-gradient halftone data. The print data generating module 210d receives this halftone data and rearranges it in the order used by the printing apparatus 400. After this rearrangement processing is completed, prescribed information such as the image resolution is added to the rearranged data to generate print data, and the composite data is output to the printing apparatus 400 via the USB I/F 190b. The printing apparatus 400 prints the image displayed on the display 180 based on the print data.

In this printing process, color conversion is performed with reference to the LUT created according to the present invention. Because this LUT is created based on an interpolation formula consisting of the spline interpolation formula subjected to correction and optimization, as described above, the color conversion module 210b is capable of highly accurate color conversion. Incidentally, the processing carried out by the PRTDRV 210 described above is a very common form of print processing. Therefore, if a LUT is created according to the color conversion table creation method of the present invention, extremely high quality printing can be achieved without completely changing the hardware construction for a large number of printing apparatuses simply by replacing the LUT used in conventional printing with the LUT of the present invention.

While the printing control device comprises the computer 110 in the above construction, the printing control of the present invention can also be executed via a program execution environment resident in the printing apparatus, such that printing control may be carried out when image data is obtained from an imaging device such as a digital camera connected directly to the printing apparatus 400. Naturally, the printing control may be executed by the digital camera using a similar construction, or various other constructions may be adopted, such as a construction in which the printing control of the present invention is distributed such that it is executed by multiple devices. Alternatively, the printing control of the present invention may be carried out in a so-called multifunction device that combines a scanner that incorporates images with a printer that prints images.

(3) Other Embodiments

As described above, in the present invention, interpolation processing may be executed with higher accuracy than that obtainable from conventional spline interpolation through the use of an interpolation formula comprising a spline interpolation formula that has undergone correction and optimization, and so long as this optimization can be performed, various constructions of the present invention may be adopted. For example, the order in which target blocks are processed is not limited to any particular order.

Furthermore, in the present invention, the function form of the function (E) may comprise a different function form than the one described above, so long as optimization is carried out while imposing one or more prescribed constraint conditions based on the colorimetric data 17a and the verification colorimetric data 17b. Moreover, in the above embodiment, while a construction was described in which a LUT that prescribes associations between the hypothetical CMY space and the L*a*b* space was created, the present invention need not apply solely to the hypothetical CMY space or any other three-dimensional space.

In other words, the relationship between the colorimetric data 17a and the verification colorimetric data 17b may be applied to four or more dimensions. For example, if the associations between CMYKlclm data and L*a*b* data are defined using the colorimetric data 17a and verification colorimetric data 17b and the CMYKlclm space is deemed a orthogonal six-dimensional space, positional relationships similar to those defined as to the grid points shown in FIG. 6 or FIG. 8 can be defined. The correction of the present invention can be applied to the spline interpolation applied to these positional relationships.

What is claimed is:

1. A profile creation method for creating a profile referred to during conversion from one color system to another by a profile creating device, the method comprising the step of:
    obtaining output color data associating the output colors for first and second color component data determined in advance;
    generating an interpolation function by an interpolation function correction unit based on the output color data for the first color component data and correcting said interpolation function by the interpolation function correction unit such that the interpolation results for said second color component data approximately match the output color data therefore; and
    generating a profile by a profile generating unit based on the corrected interpolation function,
    wherein the output color data for said first color component data is data that associates first grid points in a first color space and grid points in a second color space, and the output color data for said second color component data is data that associates second grid points that are different from said first grid points but reside in said first color space and grid points in said second color space,
    said first grid points are arranged along multiple parallel lines formed in said first color space,
    said interpolation function is an interpolation function that uses color component values in the first color space as independent variables and color component values in the second color space as dependent variables, and includes the independent variable values and dependent variable values for the first grid points surrounding the grid point to be interpolated, the second-order differentiation values of these dependent variables, and the independent variable values for the grid point to be interpolated,
    said interpolation function correction step changes the terms related to the independent variables in said interpolation function to polynomial expressions of a higher order than existed prior to correction, and
    said first color component data used for generating said interpolation function is different from said second color component data used for correcting said interpolation function.

2. The profile creation method according to claim 1, wherein said second grid points are arranged such that their distances from multiple adjacent first grid points are approximately equal.

3. The profile creation method according to claim 1, wherein one or both of said first and second grid points are arranged such that they form an orthogonal grid in the first color space.

4. The profile creation method according to claim 1, wherein said first and second grid points form orthogonal grids in the first color space and the straight lines connecting the first grid points do not intersect with the straight lines intersecting the second grid points.

5. The profile creation method according to claim 1, wherein said interpolation function correction step establishes an evaluation function that evaluates the degree of correction of said interpolation function, and obtains an optimal function form by improving an evaluation evaluated by said evaluation function while changing the function form of the interpolation function such that the post-correction interpolation results will approximately match the output data for said second color component data.

6. The profile creation method according to claim 1, wherein the terms related to said independent variables include a first-order independent variable, and a constraint condition is imposed such that said polynomial expressions change monotonously in said interpolation function correction step.

7. The profile creation method according to claim 1, wherein said polynomial expressions comprise a sum of terms derived by multiplying the power of the independent variable-related terms by prescribed coefficients, and the interpolation results are made to change continuously in said interpolation function correction step by making these prescribed coefficients depend on the independent variable-related terms.

8. The profile creation method according to claim 1, wherein said interpolation function is a function equivalent to the result of repeating interpolation by one-dimensional interpolation function that uses the color component values for said first color space as independent variables and the color component values for said second color space as dependent variables for the same number of times as the numbers of dimensions in said first color space, and said interpolation function correction step generates an interpolation function based on interpolation formula data that indicates said interpolation function formula recorded in advance on a prescribed recording medium.

9. The profile creation method according to claim 8, wherein said interpolation formula data is data that indicates an interpolation formula that expresses the dependent variable values for a given grid point in said first color space using the independent variable values thereof as well as the independent variable values, dependent variable values and higher-order derivative values for multiple grid points surrounding said given grid point by repeating interpolation by one-dimensional interpolation function based on the independent variable values, dependent variable values and higher-order derivative values for grid points arranged on a straight line and the independent variable values for the grid point to be interpolated for the same number of times as the numbers of dimensions in said first color space.

10. A profile creating device comprising:
   an output color data obtaining unit that obtains output color data that associates first and second color component data determined in advance and its output colors;
   an interpolation function correction unit that generates an interpolation function based on the output color data for the first color component data and corrects said interpolation function such that the interpolation results for said second color component data approximately match the output color data for the second color component data; and
   a profile generating unit that generates a profile based on the corrected interpolation function,
   wherein the output color data for said first color component data is data that associates first grid points in a first color space and grid points in a second color space, and the output color data for said second color component data is data that associates second grid points that are different from said first grid points but reside in said first color space and grid points in said second color space,
   said first grid points are arranged along multiple parallel lines formed in said first color space,
   said interpolation function is an interpolation function that uses color component values in the first color space as independent variables and color component values in the second color space as dependent variables, and includes the independent variable values and dependent variable values for the first grid points surrounding the grid point to be interpolated, the second-order differentiation values of these dependent variables, and the independent variable values for the grid point to be interpolated,
   said interpolation function correction unit corrects said interpolation function by changing the terms related to the independent variables in said interpolation function to polynomial expressions of a higher order than existed prior to correction, and
   said first color component data used for generating said interpolation function is different from said second color component data used for correcting said interpolation function.

11. A computer-readable medium encoded with a profile creation program product that causes a computer to execute a profile creation method which creates a profile referred to during conversion from one color system to another, the profile creation program product comprising:
   output color data obtaining code that obtains output color data that associates first and second color component data determined in advance and its output colors;
   interpolation function correction code that generates an interpolation function based on the output color data for the first color component data and corrects said interpolation function such that the interpolation results for said second color component data approximately match the output color data for the second color component data; and
   profile generating code that generates a profile based on the corrected interpolation function,
   wherein the output color data for said first color component data is data that associates first grid points in a first color space and grid points in a second color space, and the output color data for said second color component data is data that associates second grid points that are different from said first grid points but reside in said first color space and grid points in said second color space,
   said first grid points are arranged along multiple parallel lines formed in said first color space,
   said interpolation function is an interpolation function that uses color component values in the first color space as independent variables and color component values in the second color space as dependent variables, and includes the independent variable values and dependent variable values for the first grid points surrounding the grid point to be interpolated, the second-order differentiation values of these dependent variables, and the independent variable values for the grid point to be interpolated,
   said interpolation function correction code corrects said interpolation function by changing the terms related to the independent variables in said interpolation function to polynomial expressions of a higher order than existed prior to correction, and
   said first color component data used for generating said interpolation function is different from said second color component data used for correcting said interpolation function.

12. A printing control method that executes printing based on the profile created according to claim 1, comprising the steps of:
   obtaining image data that expresses the color of each pixel in the image to be printed in a prescribed color system;
   converting the colors indicated by said image data into color component values in the color system used by the printing apparatus based on the associations established in said profile; and
   forming the image via said printing apparatus by specifying the amounts of recording material to be used based on the color component values following color conversion.

13. A printing control apparatus that executes printing based on the profile created according to claim 10, comprising:
   an image data obtaining unit that obtains image data that expresses the color of each pixel in the image to be printed in a prescribed color system;
   a color conversion unit that converts the colors indicated by said image data into color component values in the color system used by the printing apparatus based on the associations established in said profile; and
   a printing unit that forms the image via said printing apparatus by specifying the amounts of recording material to be used based on the color component values following color conversion.

14. A computer-readable medium encoded with a printing control program product that causes a computer to execute a printing method which executes printing based on profile data created according to claim 11, the printing control program product comprising:

image data obtaining code that obtains image data that expresses the color of each pixel in the image to be printed in a prescribed color system;

color conversion code that converts the colors indicated by said image data into color component values in the color system used by the printing apparatus based on the associations established in said profile; and printing code that forms the image in said printing apparatus by specifying the amounts of recording material to be used based on the color component values following color conversion.

* * * * *